United States Patent
Mizuno et al.

[11] Patent Number: 5,881,323
[45] Date of Patent: Mar. 9, 1999

[54] INSTANT PHOTO FILM PACK AND INSTANT CAMERA FOR USE WITH THE SAME

[75] Inventors: Kazunori Mizuno; Minoru Ono; Kiichiro Kitagawa, all of Kanagawa, Japan

[73] Assignee: Fuji Photo Film Co., Ltd., Kanagawa, Japan

[21] Appl. No.: 988,009

[22] Filed: Dec. 10, 1997

[30] Foreign Application Priority Data

Dec. 11, 1996 [JP] Japan ............................ 8-330734
Feb. 5, 1997 [JP] Japan ............................ 9-022476

[51] Int. Cl.$^6$ .................................................. G03B 17/52
[52] U.S. Cl. ........................... 396/30; 396/527; 206/455; 378/184; 378/183
[58] Field of Search ............................ 396/30, 527, 528; 378/182–184; 206/455

[56] References Cited

U.S. PATENT DOCUMENTS 5,055,869 10/1991 DiPietro ................................. 396/517
5,139,148 8/1992 Peeters et al. .......................... 206/455
5,390,793 2/1995 Kausch et al. ......................... 206/455

FOREIGN PATENT DOCUMENTS 7209814 8/1995 Japan .

Primary Examiner—D. Rutledge
Attorney, Agent, or Firm—Sughrue, Mion, Zinn, Macpeak & Seas, PLLC

[57] ABSTRACT

An instant photo film pack contains has a light-tight bag, which contains a stack of ten photo film units of a self-processing type in a light-tight manner. The light-tight bag has a bag component constituted by one belt-shaped sheet, and a tab projecting from the bag component. The bag component is formed by attaching one portion to another in a peelable manner. When the tab is pulled in one direction, attachment of the bag component is peeled, to strip the bag from the photo film units in a form of the belt-shaped sheet.

35 Claims, 22 Drawing Sheets

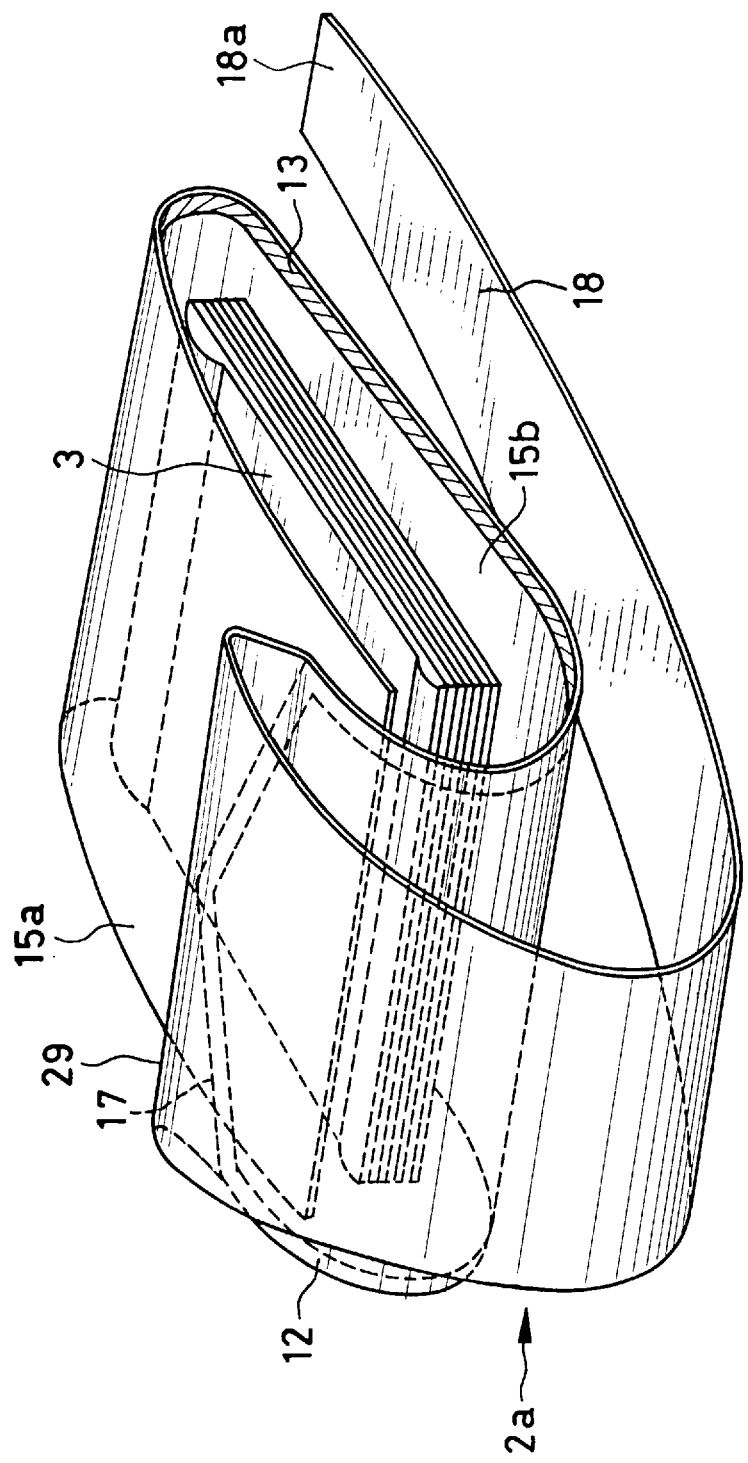

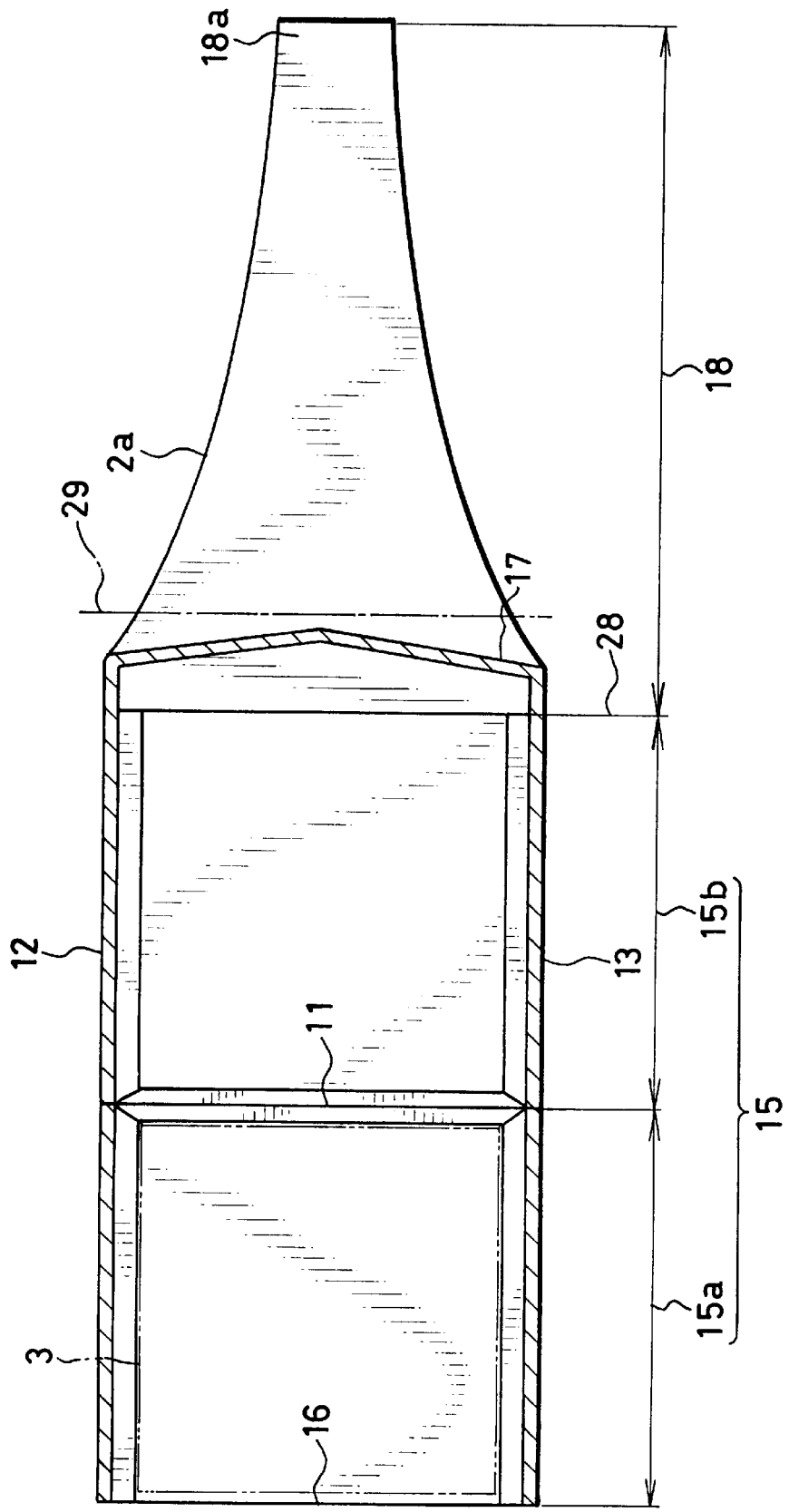

F I G. 15
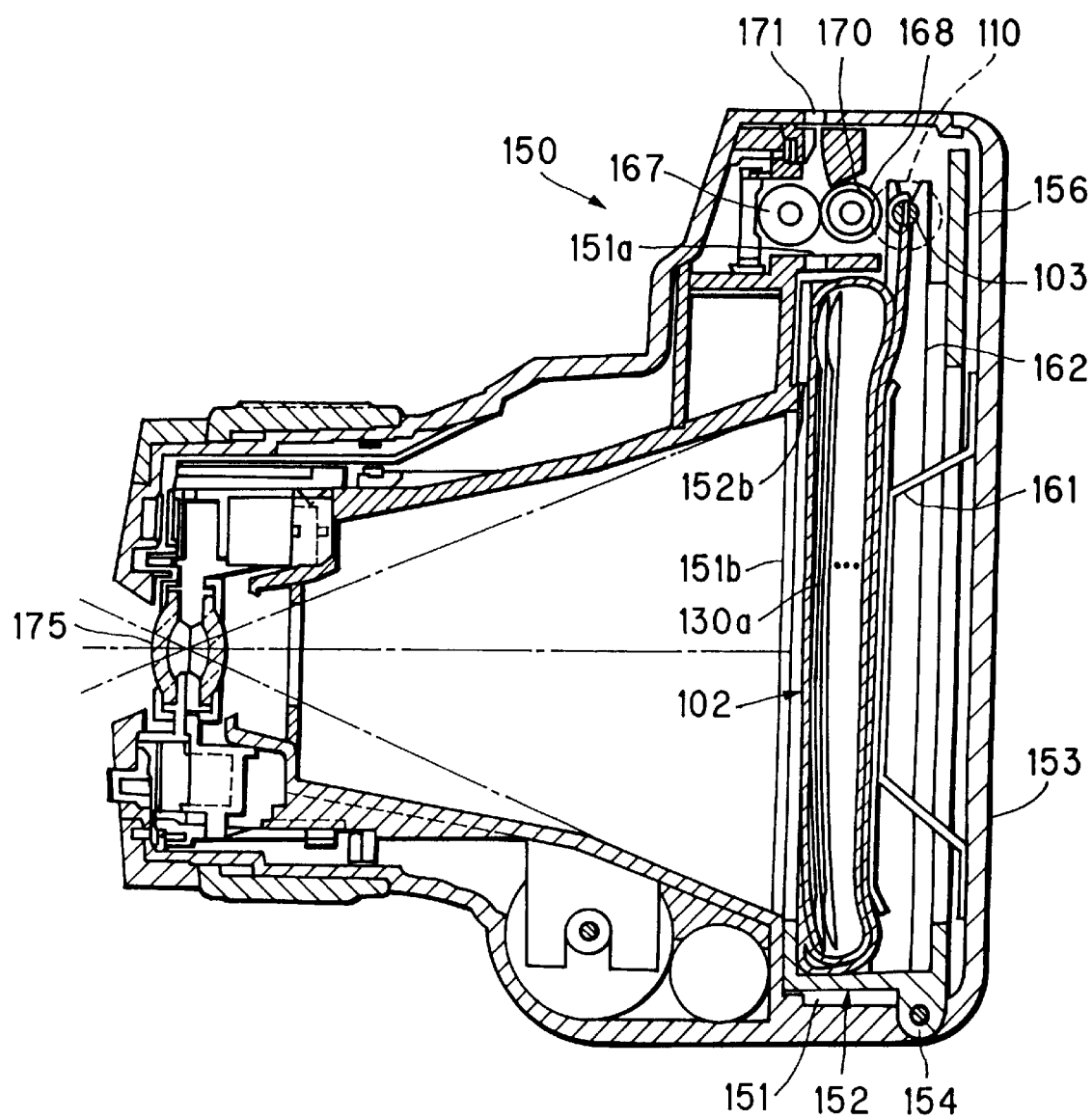

F I G. 16
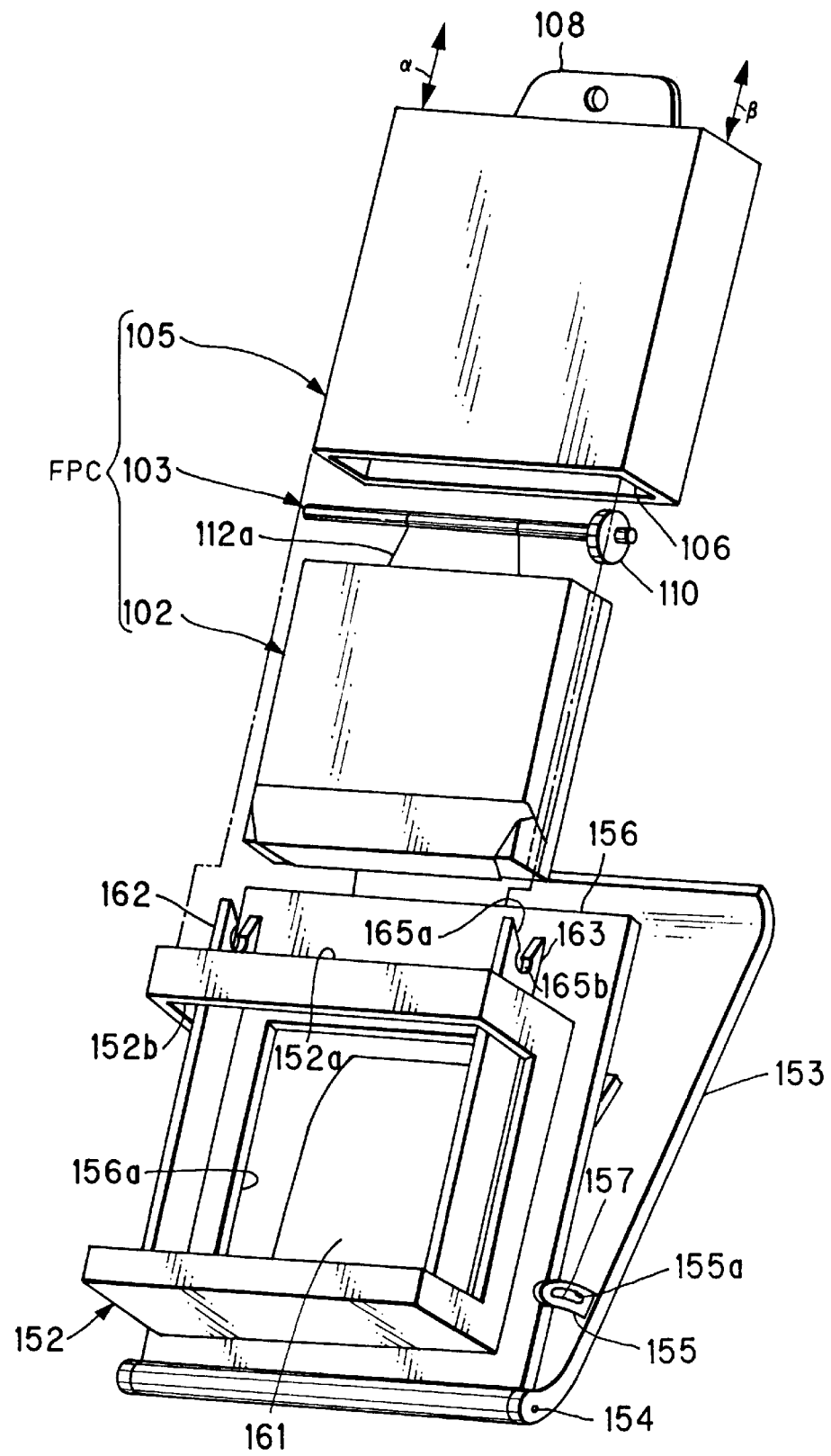

F I G. 18A
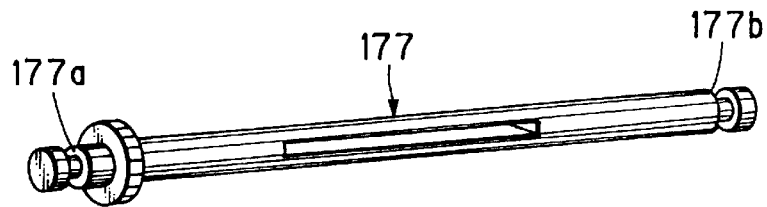
F I G. 18B
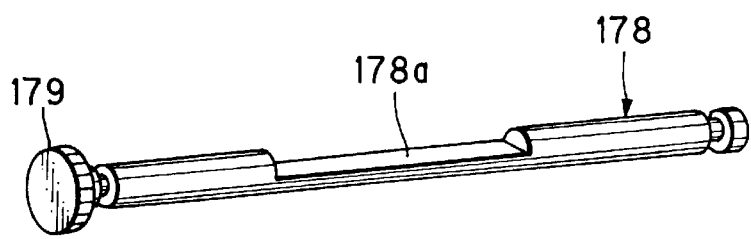
F I G. 18C
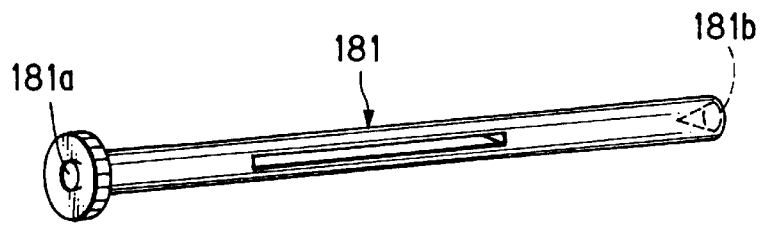
F I G. 18D
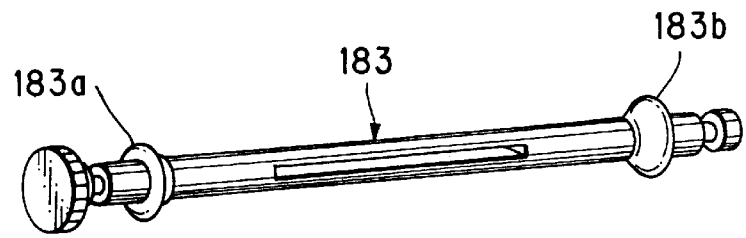

F I G. 19
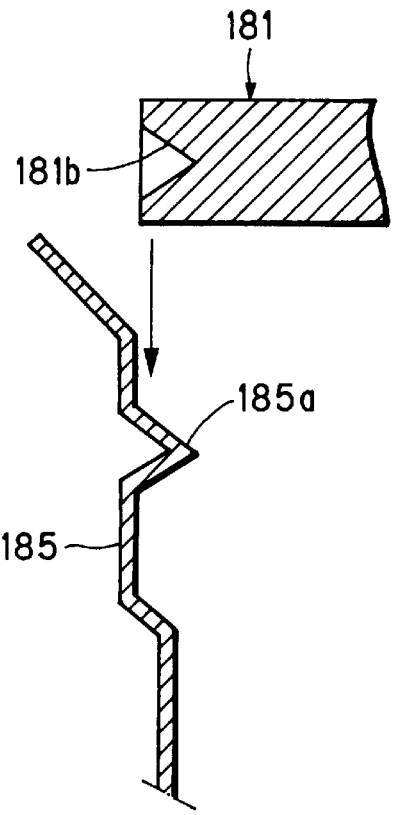
F I G. 20
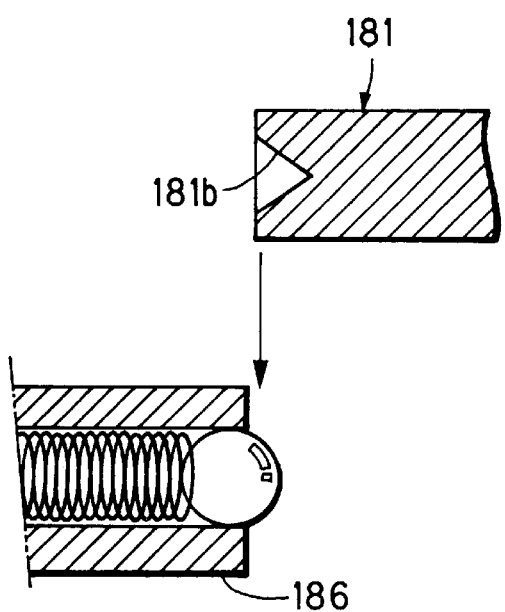

INSTANT PHOTO FILM PACK AND INSTANT CAMERA FOR USE WITH THE SAME

BACKGROUND OF THE INVENTION

1. Field of the Invention

The present invention relates to an instant photo film pack and an instant camera for use with the same. More particularly, the present invention relates to an instant photo film pack with which an instant camera can be loaded easily and quickly, and which is constituted of less costly parts, together with an instant camera for use with the same.

2. Description Related to the Prior Art

JP-A 7-209814 discloses an instant photo film pack for use with an instant camera. The instant photo film pack consists of a light-tight container, which is formed from hard plastic, and shaped in a box with a small height. A stack of a plurality of photo film units is contained in the light-tight container. The photo film units are a self-processing type, and for example a mono-sheet type.

The light-tight container has an exposure opening and an exit opening for ejection of the photo film units after an exposure. Inside the light-tight container, a thin light-tight cover plate of hard plastic is overlaid on an exposure surface of an uppermost one of the photo film units for keeping ambient light from entry in the exposure opening. A spring mechanism is contained between a lowest one of the photo film units and an inside wall for pushing the photo film units toward the exposure opening. The light-tight container for the instant photo film pack is structurally complicated and costly, but discarded as waste after exposing all the photo film units. This causes problems in high cost, ineffective use of resources and harm of industrial waste to environment.

U.S. Pat. No. 5,055,869 discloses the instant photo film pack in which a stack of the photo film units is enclosed in a light-tight bag having flexibility. The instant photo film pack is initially inserted in a magazine before being placed in the instant camera. The magazine includes a cutter for cutting the light-tight bag in the instant photo film pack, and pairs of rollers for ejecting the light-tight bag from the magazine.

One of the pairs of the rollers are disposed on a lid of the magazine. When the lid is closed after inserting the instant photo film pack into the magazine, the one end of the light-tight bag is squeezed by the one pair of the rollers. The opposite end of the light-tight bag is squeezed at a rear end of the magazine. When the instant camera is loaded with the magazine, the cutter disposed in the magazine is actuated to cut the opposite end of the light-tight bag. The pair of the rollers are rotated by a drive mechanism of the instant camera, to eject the light-tight bag from the magazine.

JP-A 3-89338 (corresponding to U.S. Pat. No. 5,139,148) discloses a photo film sheet cartridge in which a stack of X-ray photo film sheets is enclosed in a light-tight bag having flexibility. The photo film sheet cartridge is initially inserted in a magazine before being placed in an X-ray optical instrument.

The instant photo film pack and the photo film sheet cartridge according to U.S. Pat. No. 5,055,869 and JP-A 3-89338 (corresponding to U.S. Pat. No. 5,139,148) are for use with the magazine, and require a double loading operation including insertion of the instant photo film pack into the magazine and insertion of the magazine into the instant camera or optical instrument. The loading operation of the photo film units is complicated and cannot be effected quickly or conveniently.

SUMMARY OF THE INVENTION

In view of the foregoing problems, an object of the present invention is to provide an instant photo film pack with which an instant camera can be loaded easily and quickly, and of which parts are less costly.

Another object of the present invention is to provide an instant photo film pack in which photo film units are prevented from being fogged in manners of pressure fogging and static fogging, and an instant camera for use with the same.

In order to achieve the above and other objects and advantages of this invention, an instant photo film pack has a stack of plural photo film units of a self-processing type, and a light-tight bag for containing the photo film units in a light-tight manner. The light-tight bag has a bag component constituted by one belt-shaped sheet, and a tab disposed to project from the bag component, wherein the bag component is formed by attaching one portion to another in a peelable manner, and when the tab is pulled in one direction, attachment of the bag component is peeled, to strip the bag from the photo film units in a form of the belt-shaped sheet.

In a preferred embodiment, the belt-shaped sheet has a width greater than a width of the photo film units.

The belt-shaped sheet is three or more times as long as the photo film units.

The bag component includes a first portion defined by bending back the belt-shaped sheet about a first bend line, the first portion being substantially rectangular and surrounded by a combination of the first bend line, two lateral sides and an end side. A second portion is confronted with the first portion, defined between the first portion and the tab, a second bend line being defined between the second portion and the tab, at least the two lateral sides being attached to the second portion in a peelable manner.

The tab has first and second sections between which a third bend line is defined. The first section is bent back along the second bend line and overlaid on the first portion, the first section being attached to the first portion in a peelable manner via a sealing line. The second section is bent back along the third bend line and overlaid on the first section and the second portion, the second section having a distal end extending beyond the bag component.

The sealing line has a V-shape for being peeled gradually when the tab is pulled.

In one preferred embodiment, the belt-shaped sheet comprises a first sheet constituted by the first portion, and a second sheet constituted by the second portion and the tab, the first and second sheets are attached to each other in an undetachable strong manner via the first bend line.

In still another preferred embodiment, a winder shaft peels the light-tight bag and for winding the belt-shaped sheet, the winder shaft having a length greater than a width of the light-tight bag, a distal end of the tab being retained on the winder shaft. A bag holder contains the winder shaft and the light-tight bag containing the photo film units. A first retainer is disposed in the bag holder, for positioning the light-tight bag in a manner drawable from the bag holder. Two second retainers are disposed in the bag holder, for positioning the winder shaft in a removable manner with axial ends of the winder shaft extended beyond the width of the light-tight bag.

The bag holder includes a casing of which one end is open or openable, the casing being inserted into an instant camera with the open or openable end advanced therein, and then removed from the instant camera, the winder shaft and the light-tight bag being moved out of the open or openable end and remaining in the instant camera. The first retainer positions the light-tight bag with spaces kept for receiving a pair of support members of the instant camera between an inside of the casing and sides of the light-tight bag when the casing is inserted in the instant camera. The second retainers are disposed in a position inside the casing to allow the support members to support the winder shaft in a rotatable manner when the support members are received in the casing.

Furthermore there is a gear secured to at least one axial end of the winder shaft, engageable with a drive mechanism of the instant camera, and rotated to wind the belt-shaped sheet from the bag component.

In a preferred embodiment, the bag holder further includes a plate fixed inside the casing, the first and second retainers being secured to the plate, the light-tight bag being mounted to the plate.

The first retainer includes first and second flaps, projecting in the space, for regulating positions of lateral edges of the photo film units therebetween, the first and second flaps being folded down by the support members of the instant camera accessing the winder shaft through the space.

The two second retainers include first and second resilient retainer members, respectively secured to inside walls of the casing, confronted with respective axial ends of the winder shaft, for resiliently squeezing the winder shaft.

Or the two second retainers include at least one resilient member deformed when the casing is drawn from the instant camera, to allow removal of the winder shaft therefrom with the winder shaft kept engaged with the support members.

Moreover the two second retainers include first and second retainer plates, disposed in association with respective axial ends of the winder shaft. First and second retainer grooves are formed in respectively the first and second retainer plates, being open toward the photo film units, fitted on respectively the axial ends of the winder shaft, to support the winder shaft against the support members of the instant camera when the support members are pushed to the winder shaft, the winder shaft being removed from the first and second retainer grooves when the casing is drawn from the instant camera.

In a preferred embodiment, each of the first and second retainer plates includes a stationary portion and a movable portion between which the first or second retainer groove is located, the stationary portion being stationary inside the casing, the movable portion being swingable from the stationary portion, the movable portion being swung away from the stationary portion before the winder shaft is fitted in the first and second retainer plates.

An instant camera for use with a photo film pack cartridge includes an openable back lid for closing the photo film loader chamber. A pack holder is disposed in the loader chamber, having a pack entrance, contained in the loader chamber when the back lid is closed, moved at least partially out of the photo film when the back lid is opened, to cause the pack entrance to appear, the photo film pack cartridge being inserted into the pack holder through the pack entrance with the open end advanced. Two support means are disposed in the pack holder, engaged with the winder shaft for supporting the winder shaft by entering the casing when the photo film pack cartridge is inserted in the pack holder. A drive mechanism rotationally drives the winder shaft, the drive mechanism being connected to the winder shaft when the back lid is closed after the casing is drawn out of the pack holder, the winder shaft being rotated to unpack the instant photo film pack by winding the light-tight bag about the winder shaft, the photo film units being set in the loader chamber.

The back lid is swingable along a lower edge thereof, the pack holder is secured to an inner face of the back lid, the pack entrance being exposed upon opening the upper edge of the back lid outwards.

Each of the two support members includes a plate for entering the casing. A conical projection, protruded from the plate, for receiving each of two conical recesses, the two conical recesses being formed in respective axial ends of the winder shaft.

Or each of the two support means includes a plate for entering the casing. A ball holder is disposed on the plate. A ball is contained in the ball holder movably, for entering each of two conical recesses, the two conical recesses being formed in respectively the axial ends of the winder shaft. A spring is disposed in the ball holder, for biasing the ball toward the winder shaft.

In another preferred embodiment, each of the two support means includes a plate for entering the casing. A substantially circular axial hole is formed in a top edge of the plate, having an arc-shaped edge determined over half a circumference of one circle, being open toward the pack entrance of the pack holder, for receiving the winder shaft pushed therein and keeping the winder shaft rotatable. First and second inclined faces extend from the axial hole toward the pack entrance, inclined in a manner spread towards the pack entrance, for guiding the winder shaft toward the axial hole.

BRIEF DESCRIPTION OF THE DRAWINGS

The above objects and advantages of the present invention will become more apparent from the following detailed description when read in connection with the accompanying drawings, in which:

FIGS. 1 and 1A are a perspective illustrating an instant photo film pack;

FIG. 2 is a development view illustrating a belt-shaped sheet for a light-tight bag of the instant photo film pack;

FIG. 15 is an explanatory view in cross section, illustrating an instant camera loaded with the photo film pack;

FIG. 16 is an explanatory view in exploded perspective, illustrating a photo film loader chamber of the instant camera together with the photo film pack cartridge;

FIG. 18A is a perspective illustrating another preferred winder shaft, in which ring-shaped grooves are formed;

FIG. 18B is a perspective illustrating a winder shaft having a channel-shaped recess;

FIG. 18C is a perspective illustrating a winder shaft having conical recesses;

FIG. 18D is a perspective illustrating a winder shaft having ring-shaped flanges;

FIG. 19 is a section illustrating another preferred support plate having a conical recess, with the winder shaft of FIG. 18C;

FIG. 20 is a section illustrating a support mechanism by way of a ball plunger, with the winder shaft of FIG. 18C;

DETAILED DESCRIPTION OF THE PREFERRED EMBODIMENTS OF THE PRESENT INVENTION

Figure 1:
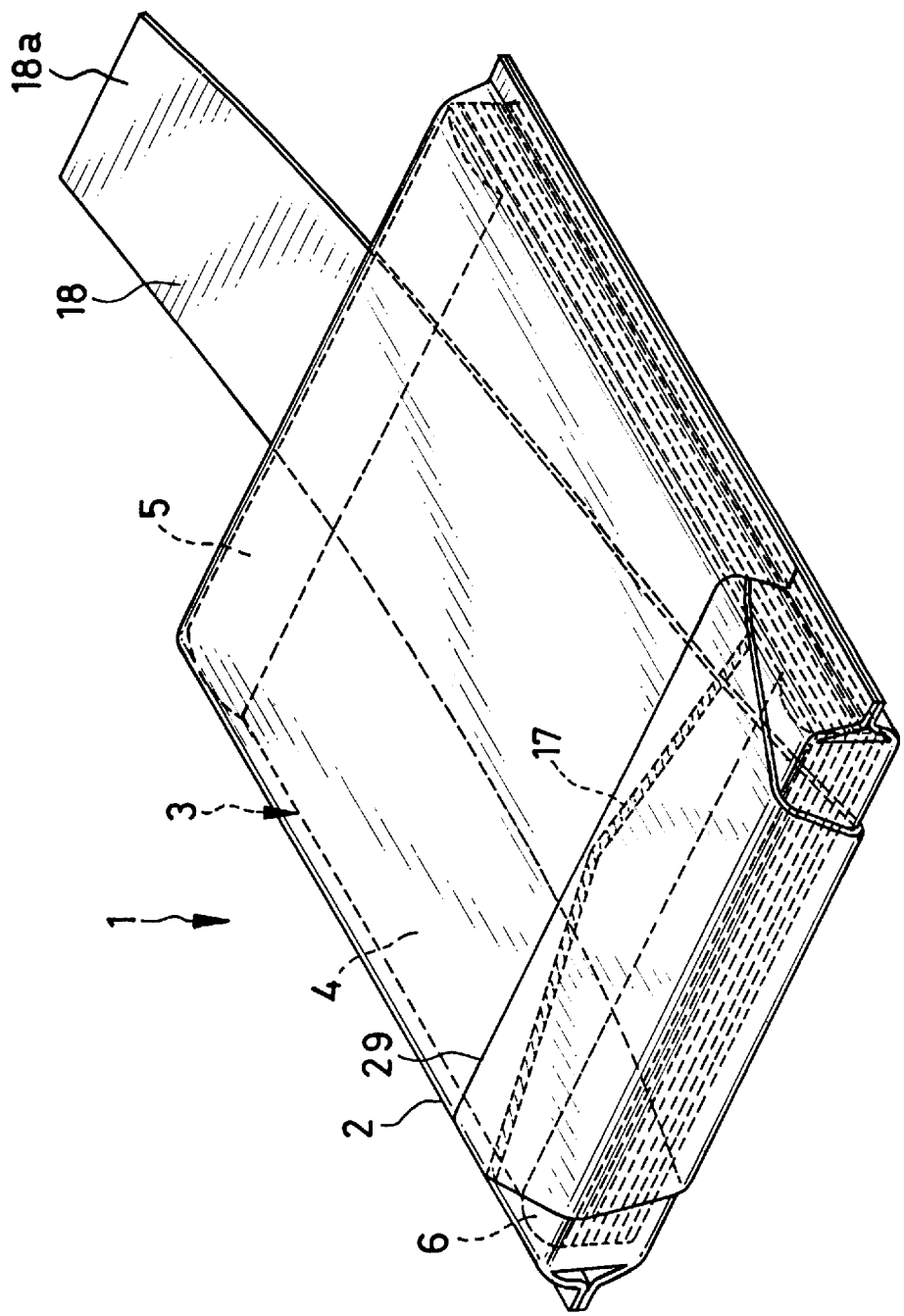

In FIG. 1, a photo film pack 1 includes a light-tight bag 2 and a stack of plural, for example ten photo film units 3 enclosed therein. The photo film units 3 are a self-processing type, and are a unit including a photosensitive sheet 4, a solution pod 5 and a trap portion 6. As is well known in the art, the photosensitive sheet 4 includes a photosensitive layer and an image-receiving layer. The solution pod 5 pre-contains processing solution for development. The trap portion 6 captures surplus part of the processing solution and hardens it. The photo film units 3 are included in a monosheet type which can be handled as a single rectangular sheet.

In FIG. 2, the light-tight bag 2 is formed by bending a belt-shaped sheet 2a of which one end has a reduced width. A shorter side of the belt-shaped sheet 2a is somewhat longer than the width of the photo film units 3. A longer side of the belt-shaped sheet 2a is approximately 4.3 times as long as the width of the photo film units 3. The belt-shaped sheet 2a is formed from polyethylene (PE) with which carbon black is mixed.

The belt-shaped sheet 2a is bent into two parts along a bend line 11 or connective line oriented in the width direction of the photo film units 3. Then lateral sides 12 and 13 are sealed in a weak sealing manner. Thus a bag component 15 is formed, in which all the photo film units 3 are contained. Afterwards an outer surface of a margin side 16 is weakly sealed light-tightly with a sealing line 17, which has a V-shaped in the center of the belt-shaped sheet 2a in a readily peelable manner. Then a tab 18 of the belt-shaped sheet 2a is bent back. In FIG. 1A, a first end 18a of the tab 18 is protruded to the outside of the bend line 11 or an end of the bag component 15. Note that the lateral sides 12 and 13 and the sealing line 17 are indicated with hatched portions, which is pre-coated with a thin coating of adhesive agent for weak sealing. When those portions are heated and pressurized, the weak sealing is effected.

It is also to be noted that the bag component 15 is constituted by first and second portions 15a and 15b. Reference numerals 28 and 29 designate bend lines.

Note that the term of the "weak sealing" is defined in the following manner: Two sheets are attached to one another with an attaching area of 20×5 mm. A first one of the sheets are pulled away from the second one of them horizontally in a longitudinal direction of the attaching area. The force of pulling the first sheet is measured till the sheets are peeled by 5 mm. The maximum of the pulling force is 700 grams or less, preferably in a range of 100–500 grams. Examples of forming the weak sealing include a type with a coating of adhesive agent, a type in which contact between layers has low tightness, a type constructed by coextrusion with heat-sealing resin, and the like. The most preferable example is the type with the adhesive agent.

The adhesive agent is preferably thermoplastic adhesive agent. Examples of the adhesive agent are resins of vinyl types, resins of condensation polymerization types, and resins of addition polymerization types. The vinyl types include polyvinyl acetate and polyacrylic acid ester. The condensation polymerization types include polyamide and polyester. The addition polymerization types include thermoplastic polyurethane and polyvinyl alcohol. Two or more of them may be mixed up to be used.

To weaken the sealing effectively, an amount of the adhesive agent may be lowered. Or a molecular weight of the adhesive agent may be lowered. Or cohesive force of the adhesive agent may be lowered by addition of other resins such as filler, plasticizer and thickener. Otherwise an attaching surface or a back surface of the sheet may be processed with material characteristically difficult to adhere, such as silicone and fluorine compounds, to lower adhesive strength of the interface.

To choose the adhesive agent, wettability between the adhesive agent and the base material should be considered. If the wettability is low, it is impossible to coat the sheet member with the adhesive agent uniformly. For application of the coating, a gravure coating method or an edge coating method is used. A rate of the coating is 20–21 g/m$^2$, preferably 10–13 g/m$^2$.

Figure 3:
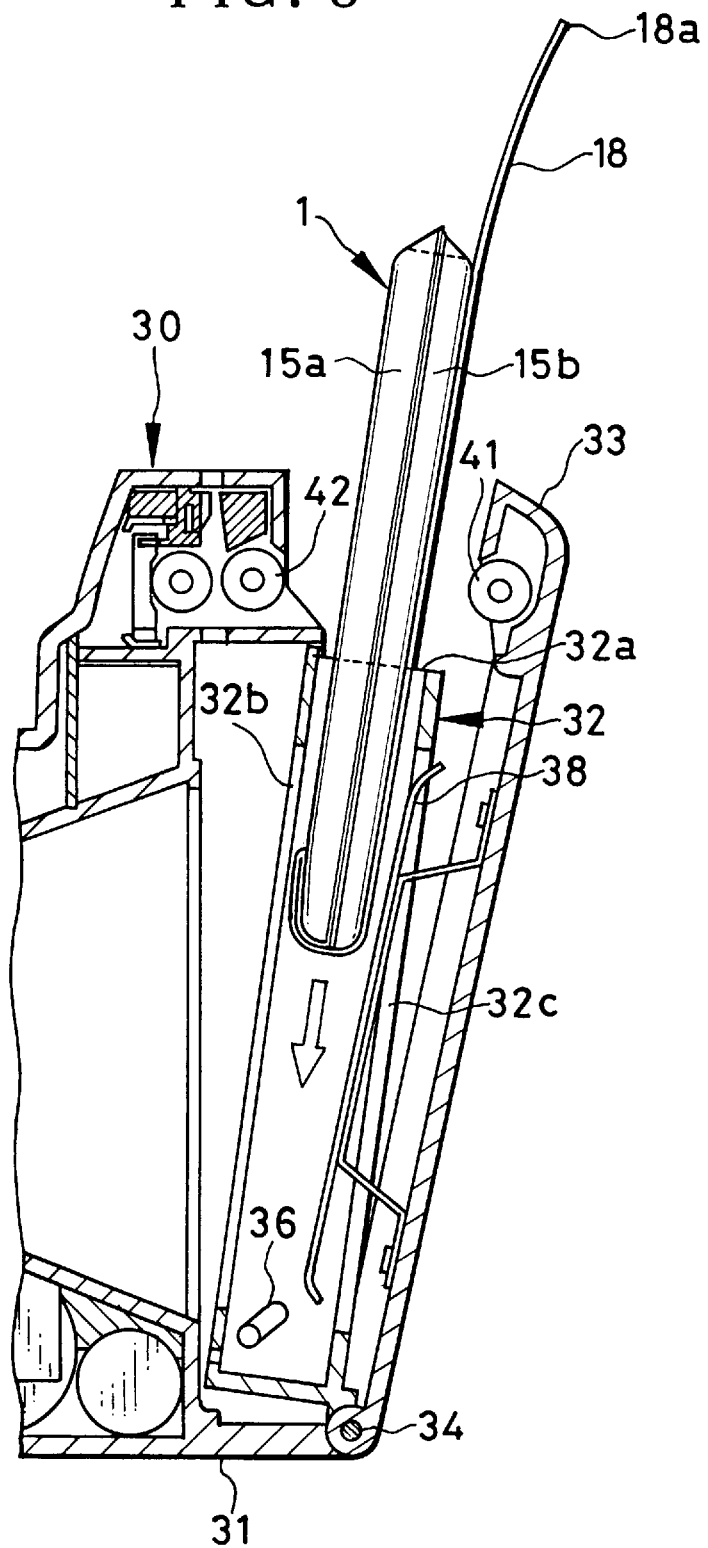
FIGS. 3 and 3A are an explanatory view in cross section, illustrating a photo film loader chamber of an instant camera together with the photo film pack.
Figure 3A:
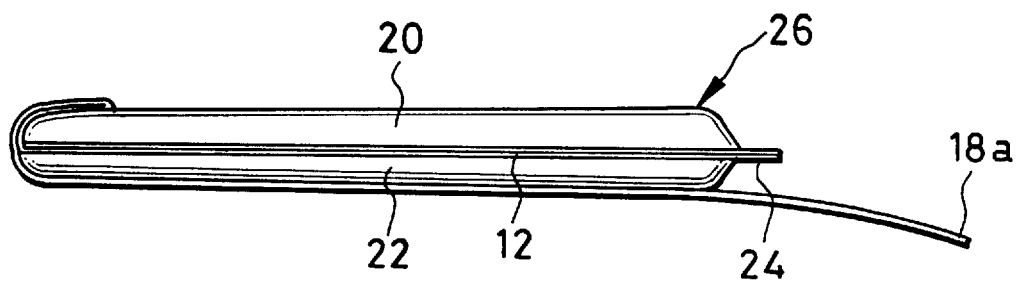

In FIGS. 3A and 3, the photo film pack 1 is inserted into a photo film pack holder 32 of a loader chamber in an instant camera 30 for use with the photo film pack 1. The pack holder 32 is secured to an inner surface of a back lid 33 in a rotatable manner, and biased in a direction away from the back lid 33 by a spring (not shown) disposed at a shaft 34. A stopper 36 limits openness of the pack holder 32. Also openness of the back lid 33 is limited. When the back lid 33 is opened and stopped at a fully open position, a pack entrance 32a of the pack holder 32 appears between a camera body 31 and the back lid 33. The pack holder 32 has an exposure aperture 32b formed in its front wall near to the taking lens, and an opening 32c formed in its rear wall for receiving a pressure plate 38 through it.

Figure 4:
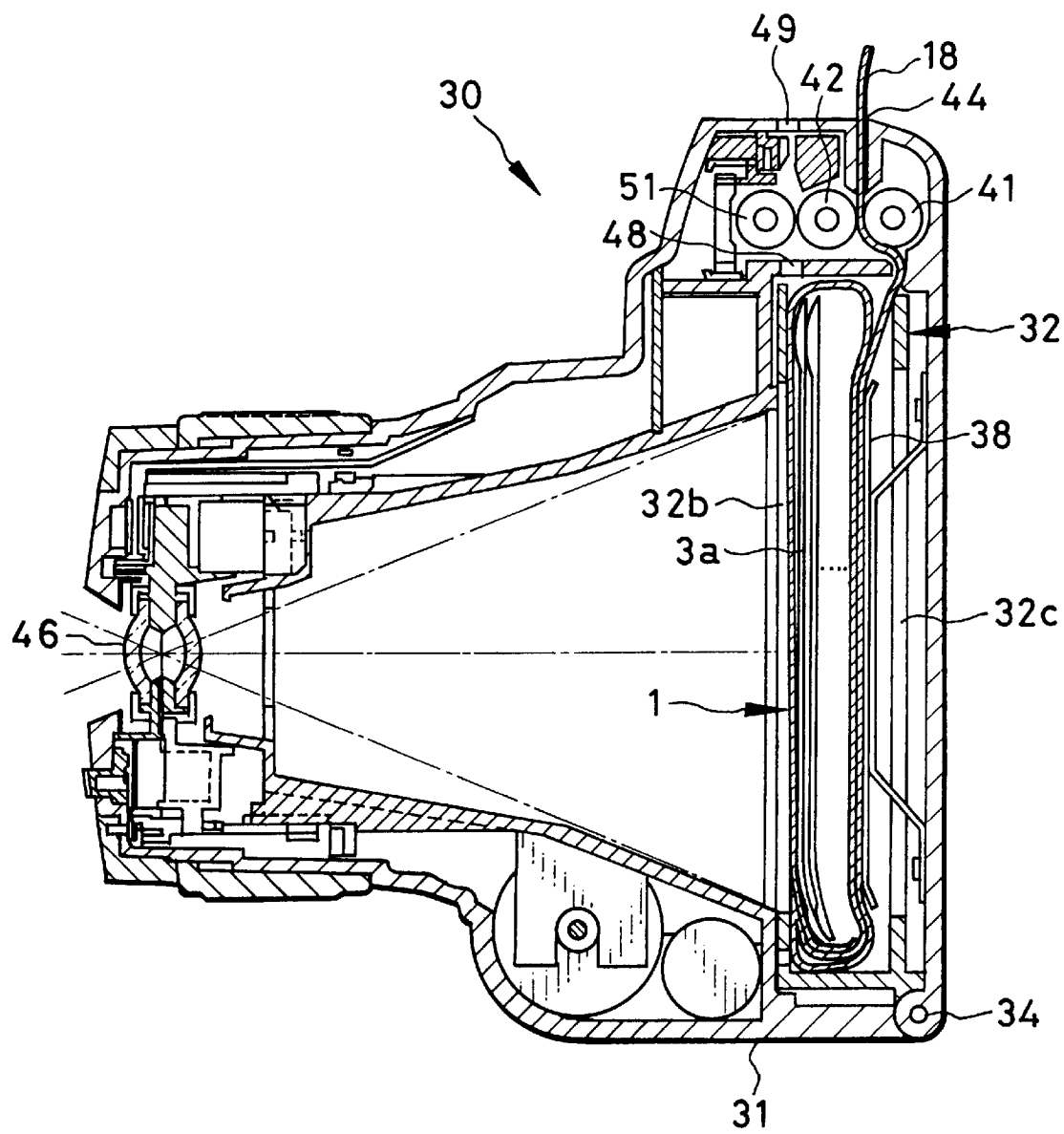
FIG. 4 is an explanatory view in cross section, illustrating the instant camera loaded with the photo film pack.

A top of the back lid 33 has a driven roller 41. When the back lid 33 is closed after insertion of the photo film pack 1 into the pack holder 32, the tab 18 of the photo film pack 1 is squeezed between the driven roller 41 and a drive roller 42, which in FIG. 4 is disposed in the top of the camera body 31. Then a shutter release button is depressed to cause the drive roller 42 to rotate in the counterclockwise direction. The tab 18 is exited through a slit-shaped bag exit 44 formed between the camera body 31 and the back lid 33.

When the tab 18 is exited, at first the sealing line 17 is peeled away from the portion of the bag component 15 near to the margin side 16. As the sealing line 17 has the V-shape, the pulling force for the sealing line 17 is initially applied to the vertex of the sealing line 17, which can easily start being peeled. The position of being peeled is shifted in two directions toward each of both sides. Accordingly the entirety of the sealing line 17 can be peeled with a comparatively small force in contrast with a straight sealing line which would be used in place of the sealing line 17. Then the lateral sides 12 and 13 are peeled to disassemble the light-tight bag 2 into the belt-shaped sheet 2a of the original form. When the entirety of the belt-shaped sheet 2a is exited from the bag exit 44, the stack of the photo film units 3 remains in the pack holder 32, to finish the photo film loading operation. Note that the tab 18 may be pulled manually by a user's fingers instead of the driven roller 41, to exit the belt-shaped sheet 2a from the camera. It is preferable to use pile fabric, velvet, or other suitable light-shielding cloth attached to the inside of the bag exit 44 to prevent ambient light from entry into the camera through it.

A taking lens 46 is directed to target a photographic subject. When the shutter release button is depressed, an uppermost photo film unit 3a among the photo film units 3 is exposed through the exposure aperture 32b by operation of the shutter. Immediately after the exposure, an ejector claw inside the camera body 31 is moved, is engaged with an edge of the trap portion 6 of the uppermost photo film unit 3a, and pushes the uppermost photo film unit 3a up toward photo film exit paths 48 and 49. The drive roller 42 is starting rotation in the clockwise direction.

When the solution pod 5 of the uppermost photo film unit 3a is passed through the exit path 48, the drive roller 42 and a driven roller 51 squeeze the solution pod 5 and moves it to the exit path 49. While the uppermost photo film unit 3a exits from the exit path 49, the processing solution is uniformly spread on the photosensitive sheet 4 of the uppermost photo film unit 3a by the drive roller 42 and the driven roller 51. At the lapse of a predetermined time, a positive image of a photographic subject appears on the photosensitive sheet 4 of the uppermost photo film unit 3a.

The shutter release button is depressed similarly. Every one of the photo film units 3 in the pack holder 32 is exposed. When all the photo film units 3 are used up, the pack holder 32 becomes empty. It is unnecessary to remove an empty pack like the prior art.

As described with the above embodiment, the light-tight bag 2 for the photo film pack 1 is formed by bending the belt-shaped sheet 2a, by sealing edges of the belt-shaped sheet 2a, and then by sealing it to close an inserting entrance for the photo film units 3. After the instant camera 30 is loaded with the photo film pack 1, the first end 18a of the belt-shaped sheet 2a is pulled in one direction to apply pulling force to the sealed portions and the inserting entrance such that at least one lateral end of the belt-shaped sheet 2a is peeled. The sealed portions are peeled in a serial manner to disassemble the light-tight bag 2, which becomes the belt-shaped sheet 2a again while pulled out of the instant camera 30. Consequently the light-tight bag 2 of the photo film pack 1 is not limited to the above embodiment. Another preferred embodiment is depicted in FIG. 5.

Figure 5:
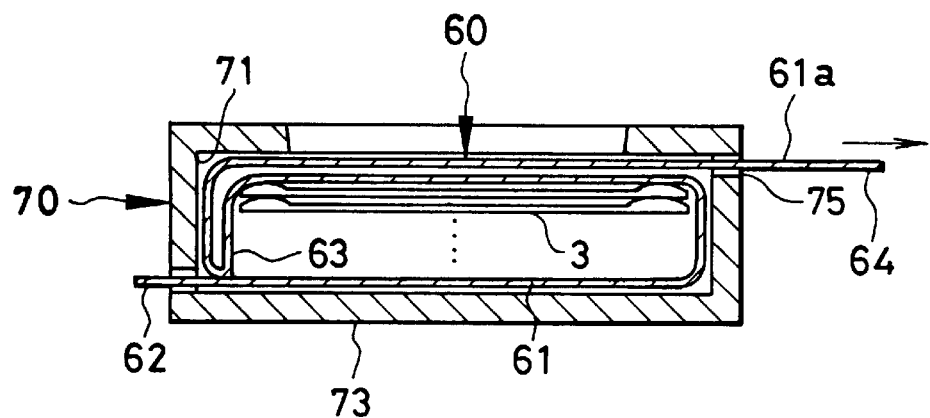
FIG. 5 is an explanatory view in cross section, illustrating another preferred photo film pack, of which a light-tight bag has a margin extension.

In FIG. 5, a light-tight bag 61 of a photo film pack 60 is constituted by a belt-shaped sheet 61a in a manner similar to the light-tight bag 2. A margin extension 62, which corresponds to the margin side 16, extends flatly without adhesion to an inner surface of a bend line 63. A position inward from the margin extension 62 is sealed to an end of the bend line 63. In loading an instant camera 70 with the photo film pack 60, the margin extension 62 is squeezed between an edge wall of a photo film loader chamber 71 and a back lid 73.

After closing the back lid 73, a tab 64 is pulled. As the margin extension 62 is fixedly held, an end of the bend line 63 can be easily peeled from the inside of the margin extension 62. The tab 64 is further pulled, to peel the sealing along the lateral sides 12 and 13 to disassemble the light-tight bag 61, which becomes the belt-shaped sheet 61a again. Again the tab 64 is pulled forcibly to disengage the margin extension 62 from between the loader chamber 71 and the back lid 73, to eject the entirety of the belt-shaped sheet 61a through a bag exit 75.

In the above embodiments, the light-tight bag is constructed from the single belt-shaped sheet. Alternatively a light-tight bag 26 may be constituted by two pieces including a first sheet 20 and a second sheet 22 as depicted in FIG. 3A. The first sheet 20 is nearly as long as the photo film units 3. The second sheet 22 is over two times as long as the photo film units 3. At first the first sheet 20 is overlapped on the first sheet 22 to locate along an end line 24 as connective line of the second sheet 22. The lateral sides 12 and 13 and the sealing line 17 as the remaining three of the four sides of the first sheet 20 are sealed on the second sheet 22 to form a bag shape.

The sealing line 17 is formed in the V-shape. The lateral sides 12 and 13 in parallel are sealed straight. The second sheet 22 is bent back to obtain the form similar to the first embodiment. The end line 24 being flat is an inserting entrance for the photo film units 3, so that the photo film units 3 can be inserted easily. After inserting the plurality of the photo film units 3 into the bag component 15, the inserting entrance is sealed and closed in a manner stronger than the other three sides so as to keep connection even when the first end 18a of the second sheet 22 is pulled.

After inserting a light-tight bag 26 into the instant camera 30, the first end 18a of the second sheet 22 is pulled in the one direction. The lateral sides 12 and 13 and the sealing line 17 are peeled off to unpack the bag component 15 with a single belt-shaped sheet formed. Then the sheet is pulled out of the instant camera 30. Note that, to seal the end line 24 with considerably great strength, it is preferred to raise sealing temperature or sealing pressure, or apply a coating of strong adhesive agent. In the last one of the embodiments, the two sheets different in material can be used. Differences between the two materials may be in rigidity, adhesive force, liability to electrification, or lubricity.

The light-tight bag 2, 26, 61 of the present invention requires high light-shielding ability and lubricity and sufficient rigidity. To shield the photo film units from light, light should be reduced to 0.01 lux·second or less by passage through the light-tight bag 2, 26, 61. In consideration of the severest condition with outer light of 100,000 lux for 100 seconds, the light-tight bag 2, 26, 61 should have so high light-shielding ability as to reduce light at a ratio of $1/10^9$. Consequently the light-tight bag 2, 26, 61 preferably includes carbon black, aluminum foil, vapor deposition of aluminum and the like, and combinations thereof. A ratio of adding carbon black is preferably 1 g/m$^2$ or more, desirably 1.5 g/m$^2$ or more. JP-A 3-179342 discloses carbon black preferred in the present invention with a small amount of sulfur component.

Preferred carbon black is furnace carbon black having pH 5–9 and an average grain diameter of 10–80 m$\mu$, and particularly furnace carbon black having pH 6–8 and an average grain diameter of 15–50 m$\mu$, because of good light-shielding performance and little affect to image reproduction (fogging and/or increase or decrease in the photosensitivity) of the photo film. Also acetylene black is preferable with little affect to image reproduction.

Representative examples of preferred carbon blacks on the market include Carbon Black #20(B), #30(B), #33(B), #40(B), #41(B), #44(B), #45(B), #50, #55, #100, #600, #950, #2200(B), #2400(B), MA8, MA11 and MA100 (trade names), all produced by Mitsubishi Chemical Industries Ltd. Other examples of carbon blacks are Black Pearls 2, 46, 70, 71, 74, 80, 81 and 607, Regal 300, 330, 400, 660 and 991 and SRF-S, Sterling 10, SO, V, S, FT-FF and MT-FF (trade names), all produced by Cabot Corp.; and Uniteel R, BB, 15, 102, 3001, 3004, 3006, 3007, 3008, 3009, 3011, 3012, XC-3016, XC-3017 and 3020 (trade names), all produced by Ashland Chemical Co. However, the carbon black is by no means limited to these examples.

Furnace carbon black particle of less than 10 m$\mu$ diameter is unsuitable for kneading, so that light-shielding ability and physical strength is low. Above 100 m$\mu$, dispersing quality is higher, but light-shielding ability is inferior. Increasing density of carbon black to compensate light-shielding ability results in lowering physical strength and moldability so that the products are nearly useless in practice. Most carbon blacks above or below the range of pH 5–9 are inapplicable because they are liable to adversely affect photographic properties.

As the light-shielding material, inorganic pigment such as titanium oxide, red iron oxide, calcium carbonate, etc. or organic pigment may be used in combination with the above-described carbon black.

It is known according to WO (International Publication) 89/12847 that most of carbon black contains cyanogen compounds. In general cyanogen compounds chemically interact with the photographic film to cause adverse results. The more cyanogen compounds are included, the more seriously it influences image quality of the photo film. The allowable content of cyanogen compounds, below which they do not affect the quality of the photo film, depends on the quantity of the carbon black, and is generally 3 ppm per unit weight of the carbon black. The cyanogen compound content in carbon black is measured as follows:

When the carbon black is refluxed with the presence of sulfuric acid, hydrogen cyanide is generated and is trapped by 0.1N aqueous solution of sodium hydroxide. Thereafter, the quantity of the hydrogen cyanide is determined by a method of pyrazolone spectrophotometry of 4-pyridine carboxylic acid, and is converted into the units of ppm per unit weight of the carbon black.

Cyanogen compound content in carbon black is known to correlate with dibutyl peroxide (DBP) oil absorption of the carbon black. Carbon, if it has dibutyl peroxide (DBP) oil absorption of less than 65 cm$^3$ per 100 grams, is harmful to photo film, as it contains considerable cyanogen compounds. Also, the ash content of a carbon black correlates with the cyanogen compound content. Carbon black, if it has the ash content of 0.5% or more, is harmful to photo film.

Desirable carbon black for use in the present invention, therefore, has a dibutyl peroxide (DBP) oil absorption of 65 cm$^3$ per 100 grams or more, or has the ash content of 0.5% or less. The cyanogen compound content thereof should be 2 ppm per unit weight of the carbon black at most according to the above-mentioned method.

Examples of polymers for forming the belt-shaped sheet are polyethylene (PE), polypropylene (PP), polyethylene terephthalate (PET), polyamide (PA), polycarbonate (PC), polystyrene (PS), polyphenylene oxide (PPO) and combinations thereof. Various combinations are preferred, because of rigidity, tightness in adhesion of adhesive agent, dispersibility of carbon black, easiness of lamination, easiness in vapor deposition of a layer.

A phenomenon of pinhole leaking of light is likely to occur, and must be overcome with much consideration. This is caused by irregularity in thickness or light diffusion of the light-shielding layer or the vapor deposition layer, and results in unwanted fogging of the photo film. If the sealing surface is incompletely attached in wrapping of the photo film units in the light-tight bag, ambient light may enter the bag through the partial openness in the sealing surface. Thus the sealing condition and uniformity in applying the coating on the attaching surface must be considered.

The belt-shaped sheet can be pulled away with a smaller force according to highness in lubricity between two areas of its back surface and lubricity between its attaching surface and a pressure plate of a camera. To provide the belt-shaped sheet with lubricity, there are two methods, mixing lubricant with material for the outermost layer, and applying a lubricant coating to the outer surface. Examples of lubricants are silicone oil, higher fatty acid amides such as oleic acid amide, metal salts of higher fatty acid such as zinc salt of stearic acid, higher alcohol esters, and fatty acid esters of esters of polyhydric alcohol. Also it is possible to apply a coating of acrylic types of fine grain mat agent, and silica types of mat agent. The mat agents are typically preferred for the purpose of imparting lubricity to the adhesive layer.

The rigidity of the belt-shaped sheet, if smaller, causes the resistance against the pulling operation to decrease, but raises susceptibility to breakage. If a broken portion remains in a camera, it may be photographed and may be harmful. The rigidity, if greater, causes the resistance against the pulling operation to increase. Examples of materials with low rigidity are polyethylene (PE) and polyamide (PA). Examples of highly rigid materials are polyethylene terephthalate (PET), polycarbonate (PC) and polystyrene (PS). A plurality of materials included therein are suitably combined so as to optimize the rigidity while the thickness is also considered.

To provide the belt-shaped sheet with water resistance is effective in protecting the photo film. Examples of adding water resistance to the sheet are lamination of aluminum foil, vapor deposition of an aluminum layer, vapor deposition of ceramics and the like. The belt-shaped sheet should have transmittance of water per unit area in a preferable range of 5 milligrams per (24 hours·1 m$^2$) or less under the condition of temperature of 40° C. and humidity of 90%. If the water resistance at the weakly sealed portion is considerably low, the photo film pack can be wrapped in an external package to heighten its water resistance. If the external package is used, the belt-shaped sheet does not require the additional structure for the water resistance.

After wrapping the photo film units, the photo film surface is rubbed in contact with the belt-shaped sheet while pulled out. Occurrence of static fogging is likely to be infrequent according to smallness of resistance of the photo film surface against air. There are method of mixing, or applying a coating of, antioxidant or carbon black with an inner layer of the belt-shaped sheet contacting the photo film units.

Examples of the photo film units 130 are instant films "ACE" (trade name, manufactured by Fuji Photo Film Co., Ltd.), "SPECTRA 600" (trade name, manufactured by Polaroid Corporation) and the like. In "ACE", an image appears on a surface reverse to an exposed surface. In "SPECTRA 600", an image appears on a surface where an exposed surface is located.

Figure 6:
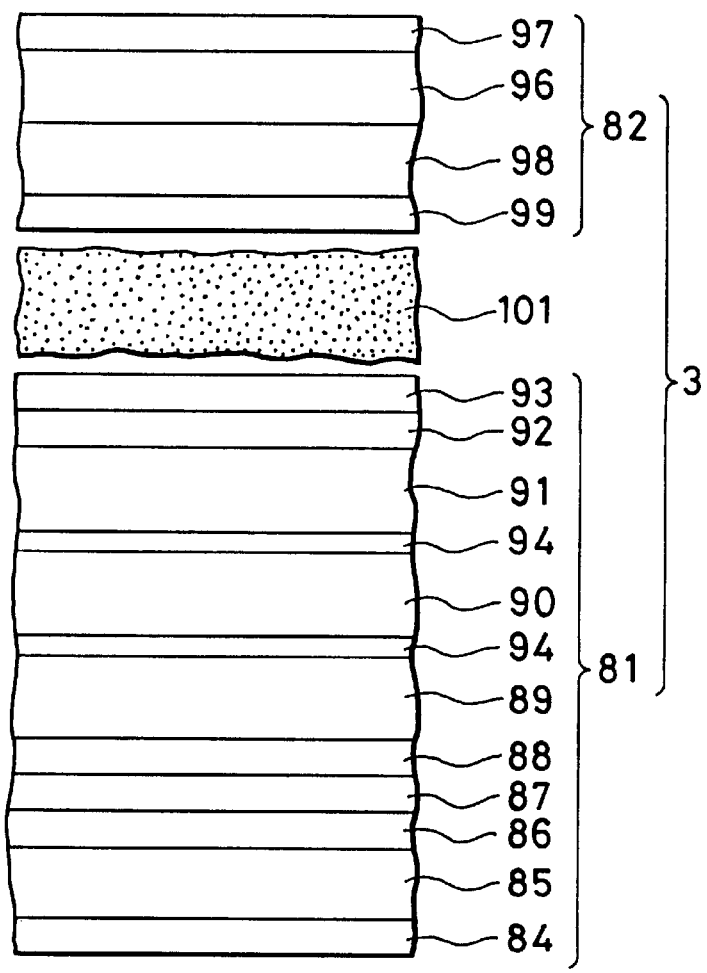
FIG. 6 is an explanatory view in section, illustrating a layered structure of each instant photo film unit.

In FIG. 6, the photo film units 3 of the "ACE" type are structured to have a photosensitive sheet 81 and a cover sheet 82. A surface of the photosensitive sheet 81 as directed upwards in FIG. 6 constitutes an exposure surface. A surface of the cover sheet 82 as directed downwards in FIG. 6 constitutes an image receiving surface. The photosensitive sheet 81 has a support 85 on which a back layer 84 is formed, and also includes an image-receiving layer 86, a white reflective layer 87, a light-shielding layer 88, a red sensitive emulsion layer 89, a green sensitive emulsion layer 90, a blue sensitive emulsion layer 91, an ultraviolet ray absorbing layer 92, and a protective layer 93 in the order listed. There are color mixture preventive layers 94 disposed respectively between the emulsion layers 89–91. The cover sheet 82 has a support 96, and includes a filter dye layer 97, a neutralizing layer 98 and timing layers 99 and 100.

The support 85 of the photosensitive sheet 81 is formed of transparent film material or sheet material suitable for photosensitive material. Examples of the material is triacetyl cellulose (cellulose triacetate, TAC), polystyrene (PS), polyethylene terephthalate (PET), polyethylene naphthalate (PEN), polycarbonate (PC) and the like. It is preferable that the support 85 includes a small quantity of dye or pigment such as titanium oxide, for the purpose of avoiding light piping.

The support 85 is 50–350 $\mu$m thick, preferably 70–210 $\mu$m thick, and desirably 80–150 $\mu$m thick. The support 85, if too thick, thickens the entire thickness of the photo film units 3 to enlarge the size of the photo film pack 1, and is inconsistent with easy handling of the photo film pack 1. The support 85, if too thin, lowers rigidity of the photo film units 3 to cause failure in their advancement and failure in keeping flatness of the photo film units 3. A back surface of the support 85 may be provided with the back layer 84 for balancing a curling tendency of the support 85, or with an oxygen shielding layer disclosed in JP-A 56-78833, if required.

The image-receiving layer 86 consists of hydrophilic colloid and mordant dye included therein. A single layer of a mordant dye may be used. Also the image-receiving layer 86 may have a multi-layer structure inclusive of plural overlaid layers of mordant dyes of plural kinds, as suggested in JP-A 61-252551. A preferable mordant dye is polymer mordant dye.

The white reflective layer 87 consists of a white background of a multi-color image, and includes white pigment and hydrophilic binder. Examples of the white pigment in the white reflective layer 87 are barium sulfate, zinc oxide, barium stearate, silver flake, silica or silicic salts, alumina, zirconium oxide, zirconate of sodium sulfate, kaolin, mica, titanium oxide and the like. The most preferable one of them is titanium oxide.

Between the white reflective layer 87 and the emulsion layers 89–91 is disposed the light-shielding layer 88, which includes light-shielding agent and hydrophilic binder.

The emulsion layers 89–91 are disposed in the position over the light-shielding layer 88. Each of the emulsion layers 89–91 includes silver halide emulsion, and a coloring dye forming substance combined therewith. The coloring dye forming substance is hereinafter described.

Coloring dye forming substance is a non-diffusible compound which releases diffusible dye or dye precursor at the time of silver processing. Or coloring dye forming substance is a substance of which diffusibility changes. Those are described in *The Theory of the Photo graphic Process, the Fourth Edition*, T. H. James, Macmillan Publishing Co., 1977. Both of those substances are expressed by the following formula:

$$(DYE\text{---}Y)_n\text{---}Z$$

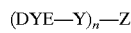

In the formula, DYE represents a dye group itself, a dye group of which a wavelength is shortened temporarily, or a dye precursor group. Y simply represents a bond or bond group. Z represents a group having such a characteristic as to create a difference in diffusibility in the compound formulated as (DYE—Y)$_n$—Z in a manner corresponding to or complementary to photosensitive silver salt with which a latent image is formed by taking an exposure, or Z represents a group having such a characteristic as to release DYE and to create a difference in diffusibility between the compound formulated as (DYE—Y)$_n$Z and the released DYE. n is 1 or 2. When n is 2, a first one of the two (DYE—Y)s may be equal to or different from the second one of them.

In view of the characteristics of Z, examples of Z include compounds of negative types and positive types. The negative types has a diffusibility in regions where silver is developed. The positive types has a diffusibility in undeveloped regions. Among the negative types of Z, dye releasing redox compounds include a preferable example of N-substituent sulfamoyl group, which is an N-substituent group derived from aromatic hydrocarbon compounds or heterocyclic compounds.

The positive types of compounds are disclosed in *Angewandte Chemie, International Edition in English*, 22, 191 (1982).

Preferable multi-layer constructions, emulsion layers are arranged in the order of a combination of plural blue sensitive emulsion layers, a combination of plural green sensitive emulsion layers, and a combination of plural red sensitive emulsion layers as viewed in a direction toward the support 85.

Between the emulsion layers 89–91, other additional layers may be disposed when required. It is preferable to dispose the color mixture preventing layers 94 for preventing an influence of processing of each one of the emulsion layers to other emulsion layers.

Furthermore other layers are formed, including an anti-irradiation layer, the ultraviolet ray absorbing layer 92, the protective layer 93 and the like. JP-A 60-128404 and JP-A 61-41143 disclose surface active agents having a fluorine atom, which are suitable to be added into the protective layer 93 to avoid static fogging. It is also possible to form partitioning layers of gelatin between any adjacent two of the plural layers, if desired. Any of the emulsion layers 89–91 can include development inhibiting precursor, reducer having resistance to diffusion, for the purpose of avoiding fogging and adjusting the gradient.

The hydrophilic binder for use in the emulsion layers 89–91 may be any suitable type that enables permeation of processing solution 101 and transfer of image dye. Examples of hydrophilic binders are gelatin, polyacrylamide, polyvinyl alcohol and the like and derivatives thereof. The hydrophilic binder may be hardened by hardening agent, which may be added in a range of 0.5–5% of the hydrophilic binder, preferably in a range of 0.5–2%.

The transparent cover sheet 82 includes the neutralizing layer 98 and the timing layer 99, both of which operate for neutralize the alkali to stabilize a reproduced image after the alkali is processed with the processing solution 101 spread uniformly on the entirety of the photosensitive element. Those layers include acid substances of a quantity sufficient for neutralize the alkali from the processing solution 101. Note that, instead of the combination of the two layers, a multi-layer construction for neutralization may be used, including a layer for adjusting neutralizing speed like the timing layer 99, a layer for reinforcing tightness in contact, and the like.

The support 96 of the cover sheet 82 is formed of transparent film material or sheet material suitable for photosensitive material. Examples of the material is triacetyl cellulose (cellulose triacetate, TAC), polystyrene (PS), polyethylene terephthalate (PET), polycarbonate (PC) and the like. It is preferable to provide the support 96 with an under coat. Also it is preferable that the support 96 includes a small quantity of dye or pigment, for the purpose of avoiding light piping.

Other auxiliary layers may be formed, including the back layer 84, the protective layer 93, the filter dye layer 97 and the like. The back layer 84 is for the purpose of regulating a curling tendency of the photosensitive sheet 81, and providing smoothness. Note that filter dye like the filter dye layer 97 may be added to the back layer 84. The protective layer 93 is for the purpose of avoiding inseparable fixedness between the photosensitive sheet 81 and the cover sheet 82, typically in the mono-sheet photosensitive material.

A trap mordant layer traps dye diffused toward the processing solution 101, to avoid delay in finishing forming an image and avoid lowering sharpness of the image. In general the trap mordant layer is formed in an outermost position of the cover sheet 82. A dye trap layer is similar to the image-receiving layer 86 in including hydrophilic colloid and polymer mordant dye included therein, and disclosed in JP-A 1-198747 and JP-A 2-282253.

In the cover sheet 82, dye may be added for adjusting the photosensitivity of the emulsion layers. Filter dye may be added into the support 96 of the cover sheet 82, the neutralizing layer 98, the back layer 84, the protective layer 93, the trap mordant layer and the like. Of course filter dye may constitute a single layer.

The processing solution 101 is an alkali processing composite, which is spread uniformly on the surface of a photosensitive element after an exposure, and develops the photosensitive emulsion layers by use of its components. The composite of the processing solution 101 includes alkali, thickener, developing agent, development accelerator, development inhibitor, antioxidant, gradient adjustor and the like. The development accelerator and development inhibitor adjust operation of the developing agent. The antioxidant avoids degradation of the developing agent.

The quantity of the alkali meets the condition of pH 12–14. Examples of the alkali are hydroxides of alkali metals such as sodium hydroxide, potassium hydroxide, and lithium hydroxide, phosphates of alkali metals such as potassium phosphate, guanidines, hydroxides of quaternary amines such as tetramethyl ammonium hydroxide, and the like. Among these preferable examples are sodium hydroxide and potassium hydroxide. Potassium hydroxide is the most preferable.

The thickener is required for uniformly spreading the processing solution 101, and for keep the photosensitive sheet 81 in tight contact with the cover sheet 82. Examples of the thickener are polyvinyl alcohol, alkali metal salts of hydroxyethyl cellulose, and alkali metal salts of carboxymethyl cellulose. The thickener preferably has a characteristic of thixotropy, for the purpose of preventing the processing solution 101 from leaking out of a container or the solution pod, and for the purpose of keeping uniformity of the processing solution 101 being spread. Preferable examples of the thickener, therefore, are hydroxyethyl cellulose, sodium salt of hydroxymethyl carboxylic acid, carboxymethyl hydroxyethyl cellulose and the like.

The processing solution 101 may include light-shielding agent if desired. Typically in the mono-sheet photosensitive material where light is passed through the transparent support 96, the processing solution 101 is required to have light-shielding ability. The light-shielding agent may be carbon black, pigment, dye, and the like. If the processing solution 101 include white pigment and if a multi-color image is rendered observable on the background of a layer of the processing solution being spread, then dyes characteristically reacting to a pH level can preferably be used by way of the light-shielding agent.

JP-A 62-215272 suggests various agents that can be preferably included in the photosensitive sheet 81, the cover sheet 82 and/or the processing solution 101. The preferable agents are as follows: development accelerators of pages 72–91 of JP-A 62-215272; hardening agents of pages 146–155; surface active agents of pages 201–210; fluorine compounds of pages 210–222; thickeners of pages 225–227; antistatic agents of pages 227–230; polymer latexes of pages 230–239; and mat agents of page 240.

Referring to FIGS. 7–25, a photo film pack cartridge is described with the purpose of preventing pressure fogging and static fogging of photo film units. Elements similar to those of the above embodiments are designated with identical reference numerals.

According to the prior art, JP-A 8-62782 (corresponding to U.S. Pat. No. 5,390,793) discloses a photo film pack, in which a stack of photo film sheets is inserted partially in a protector carrier having a channel shape, and the combination of the photo film sheets and the protector carrier is wrapped in a light-tight packaging with flexibility. When the photo film pack is loaded in a photographic printer, one end of the light-tight packaging is cut. The opposite end of the photo film pack is squeezed by rollers which eject the photo film pack. The protector carrier and the photo film sheets remain in the printer after the ejection.

However the photo film pack of JP-A 8-62782 (corresponding to U.S. Pat. No. 5,390,793) has a problem in that the light-tight packaging requires a considerably great pulling force for the rollers to pull away from the photo film sheets. It is necessary in an optical instrument to use a large motor for driving the rollers. The optical instrument, if it is an instant camera, and must have an excessively large size, must be expensive. As the light-tight packaging is flexible, it is likely that there occurs pressure fogging or static fogging to photosensitive material.

Figure 7:
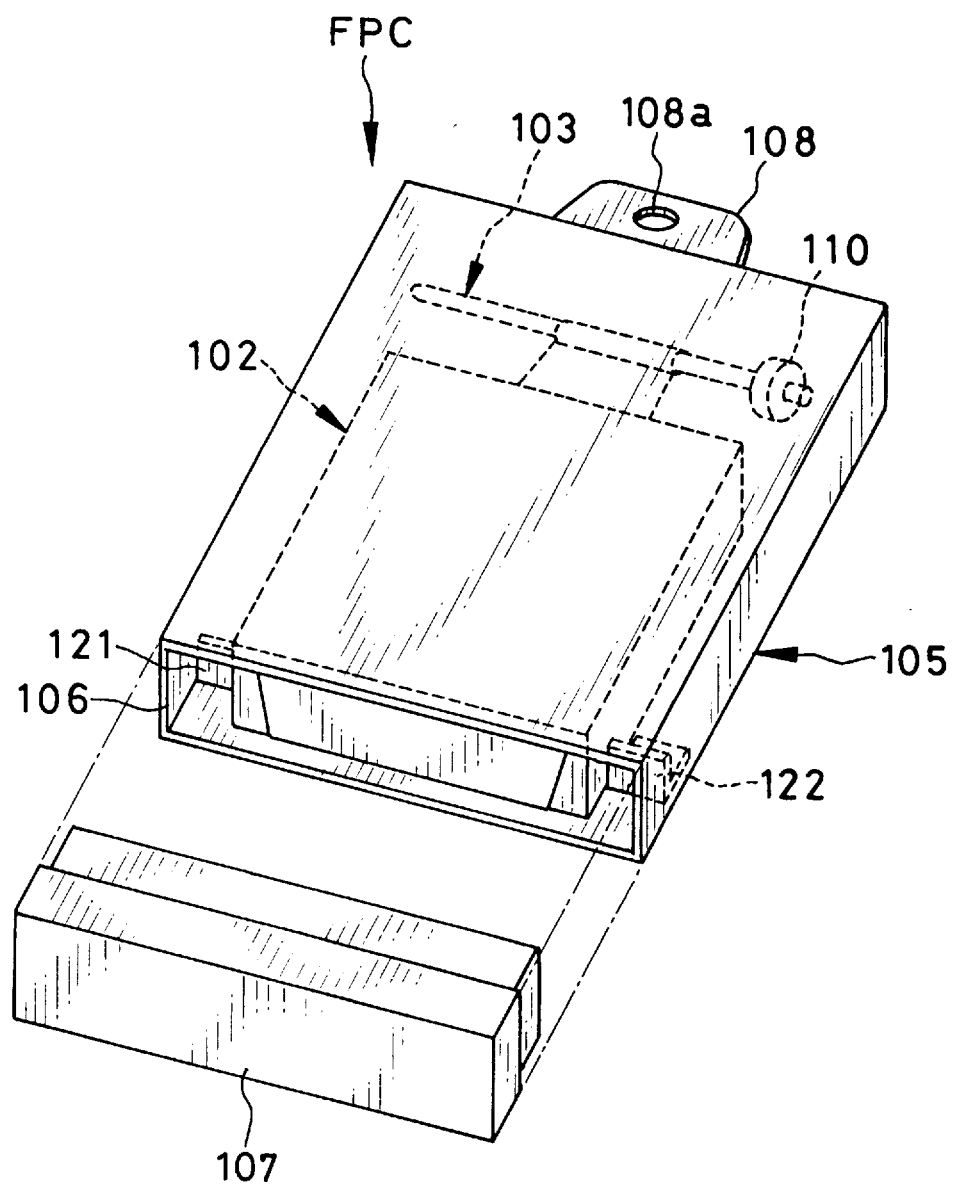
FIG. 7 is a perspective illustrating a photo film pack cartridge constituted by a photo film pack, a winder shaft and an outer casing.

In the present invention, a photo film pack cartridge FPC in FIG. 7 includes a photo film pack 102, a winder shaft 103 and an outer casing 105. The winder shaft 103 has a rod shape. The outer casing 105 is formed from paper or cardboard, contains the photo film pack 102 and the winder shaft 103, and consists of a bag holder. A bottom of the outer casing 105 has an opening 106, which is closed by a casing lid 107 formed from paper or cardboard. A top of the outer casing 105 has a tab 108, in which a hole 108a is formed and used when the photo film pack cartridge FPC is suspended in a product hanger installed in a store for commercial display.

Figure 8:
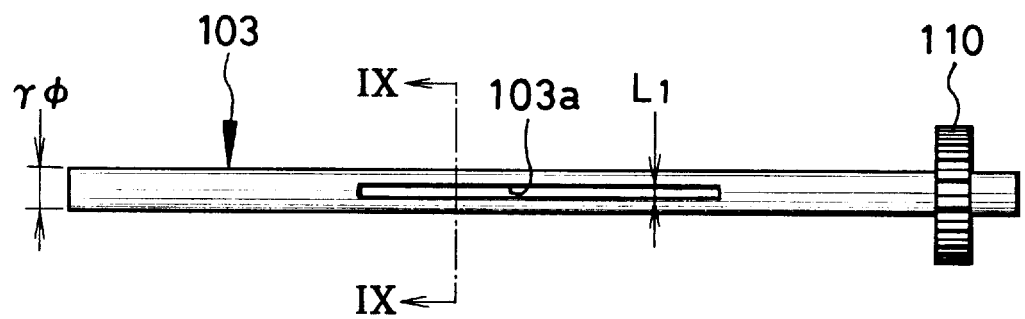
FIG. 8 is a plan illustrating the winder shaft of the photo film pack cartridge.
Figure 9:
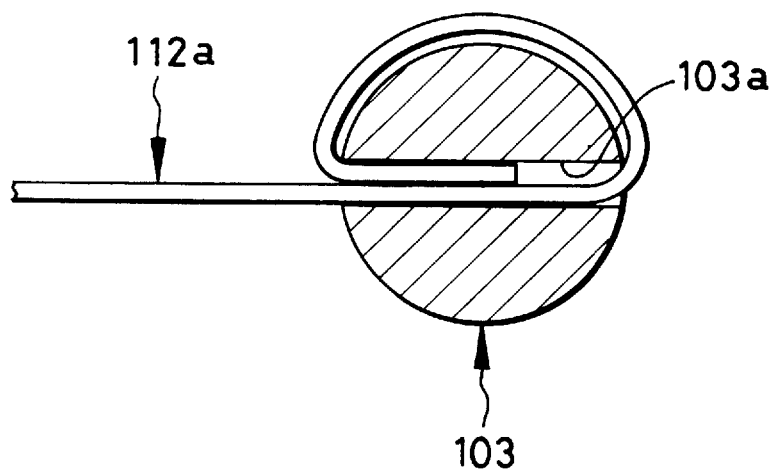
FIG. 9 is a cross section taken on line IX—IX, illustrating the winder shaft.

In FIG. 8, the center of the winder shaft 103 has a slot 103a which is L1 wide. A gear 110 is fixedly secured to one axial end of the winder shaft 103 for mesh with a gear of a spreader roller of an instant camera. In FIG. 9, one end of a belt-shaped sheet 112a is inserted in the slot 103a and secured to it. The belt-shaped sheet 112a constitutes a light-tight bag 112 in a closed shape.

A diameter φ of the winder shaft 103 is preferably in a range of 4–8 mm. In the present embodiment, =6 mm. If <4 mm, the winder shaft 103 would be too thin and insufficient in rigidity. If =8 mm, the winder shaft 103 would be too thick and wind the belt-shaped sheet 112a with an excessive diameter, which would cause difficulty in reducing the size of a camera. A width L1 of the slot 103a is in a range of 0.2–0.6 mm. The width L1 of the slot 103a may be too small for loosely receiving the belt-shaped sheet 112a being 0.2 mm thick. But the winder shaft 103 is formed from resin having flexibility or softness. When the winder shaft 103 is twisted, the width L1 is lengthened. An end of the belt-shaped sheet 112a can be inserted in the slot 103a while the winder shaft 103 is kept twisted.

Examples of materials for the winder shaft 103 are polyvinyl chloride, polystyrene, polycarbonate, polyphenylene ether, polyacetal, polyamide, polyethylene terephthalate, polybutylene terephthalate, acrylonitrile-styrene-butadiene (ABS) resin, acrylonitrile-styrene (AS) resin, and the like. A preferred one of the examples is polyacetal. Also the winder shaft 103 may be formed from metal. A rod portion and the gear 110 included in the winder shaft 103 may be formed two different materials.

Figure 10A:
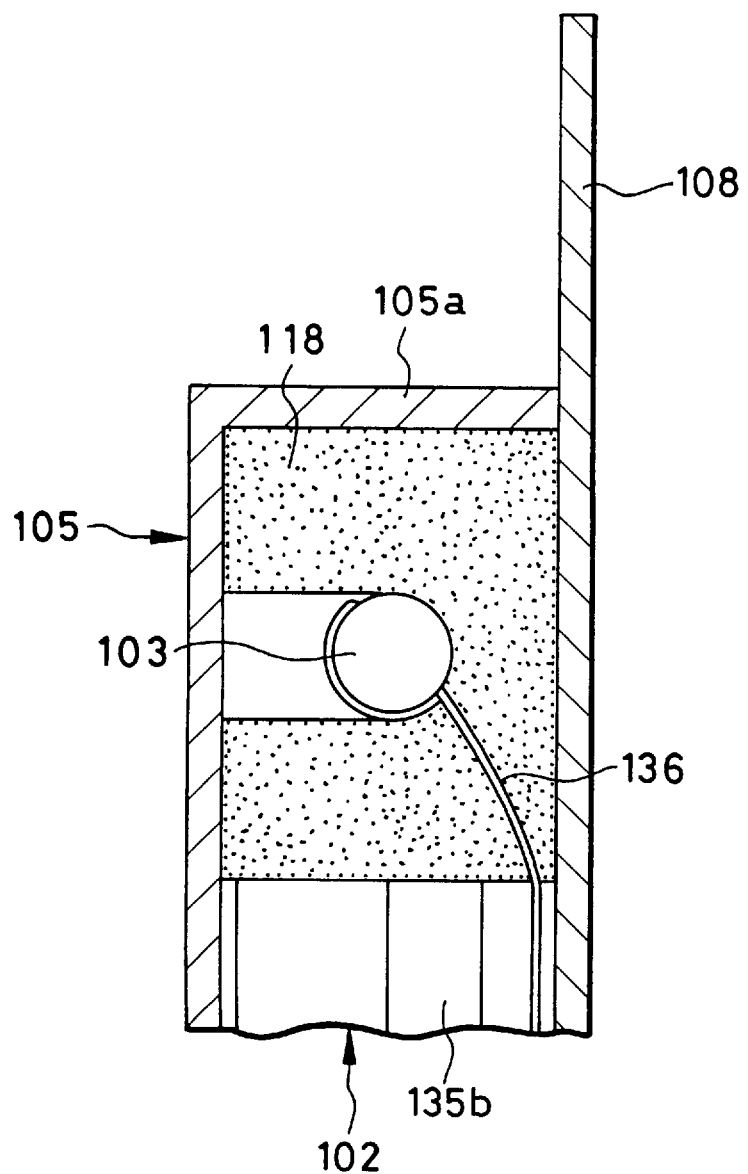
FIG. 10 and 10A are a horizontal section illustrating the photo film pack cartridge.
Figure 10:
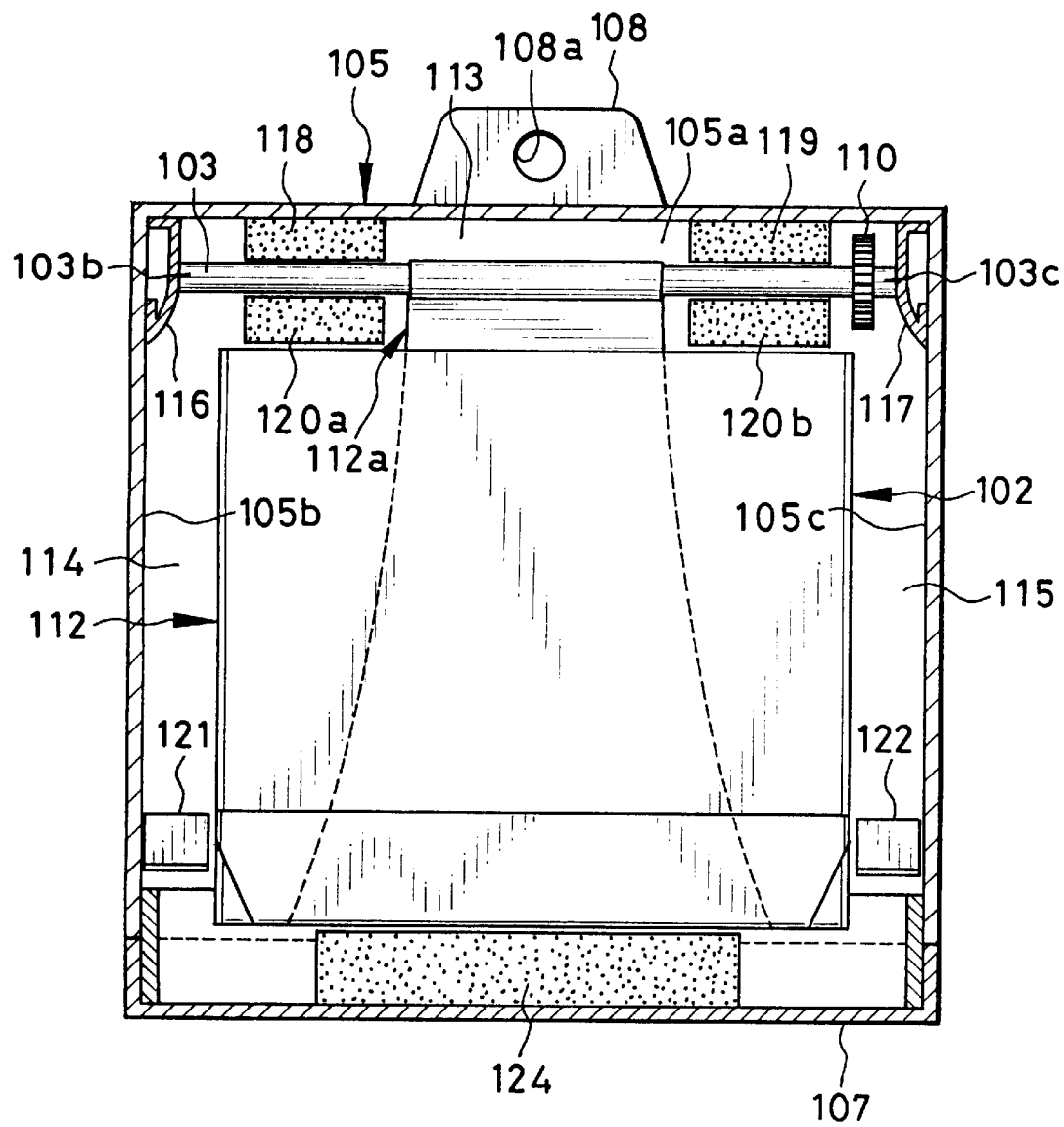

In FIGS. 10 and 10A, the outer casing 105 contains the photo film pack 102 in its center, and has a larger size than the photo film pack 102 so that a space 113 and receiving spaces 114 and 115 are formed. The space 113 is defined between an inner wall face 105a and the photo film pack 102 for receiving the winder shaft 103. The receiving spaces 114 and 115 are defined between the photo film pack 102 and inner wall faces 105b and 105c for receiving support plates, which will be described later in detail.

There are shaft retainers 116 and 117, which are fixedly disposed at corners of the inner wall face 105a of the outer casing 105, and support the winder shaft 103 in the space 113 in contact with axial ends 103b and 103c of the winder shaft 103. The shaft retainers 116 and 117 are for example formed from a short strip of thick paper or cardboard, and curved to have resiliency. Resilient retainers 118 and 119 are fixed on the inner wall face 105a, and are shaped in a rectangular parallelepiped, and formed from polystyrene foam, sponge or other material with a characteristic resiliently compressible responsive to pressure. The resilient retainers 118 and 119 keep the winder shaft 103 positioned with a given distance from the inner wall face 105a. Resilient retainer portions 120a and 120b keep the photo film pack 102 positioned with a given distance from the winder shaft 103, to allow entry of a wall of a photo film loader chamber 151 of an instant camera. The resilient retainers 118, 119 and the retainer portions 120a and 120b are sufficiently flexible, and absorb pushing force applied to the top of the outer casing 105 during the insertion, to keep the photo film pack 102 from receiving the pushing force.

Figure 11:
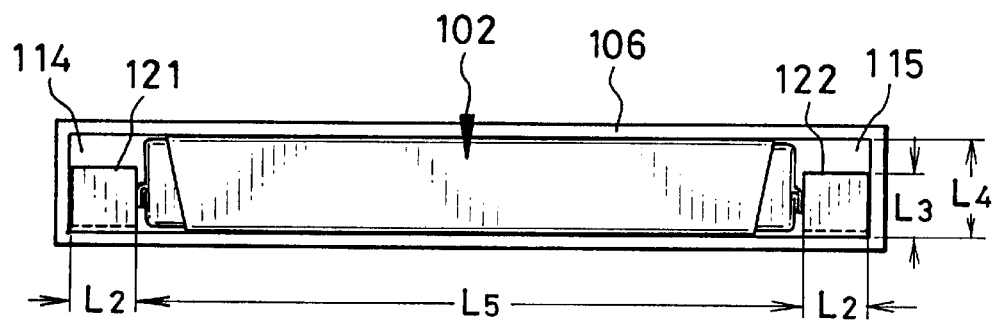
FIG. 11 is a side elevation illustrating the photo film pack cartridge as viewed through its side opening.

The receiving spaces 114 and 115 are also limited by retainer flaps 121 and 122, which position the photo film pack 102 at the center of the outer casing 105. See FIG. 11. The retainer flaps 121 and 122 are formed of thick paper or cardboard of a strip shape, and erected with a bend of a right angle. When the support plates of the camera are inserted respectively in the receiving spaces 114 and 115, the retainer flaps 121 and 122 are pushed by the support plates, and folded to fall down. In FIG. 11, a width L2 and a height L3 of the retainer flaps 121 and 122 are both 10 mm. A height L4 of the receiving spaces 114 and 115 is 15 mm. Examples of photo film units 130 are instant films "ACE" (trade name, manufactured by Fuji Photo Film Co., Ltd.). With the instant films "ACE", an interval L5 between the retainer flaps 121 and 122 is preferably 105 mm.

A resilient retainer 124 is fixed on the center of the inside of the casing lid 107, and is formed in a rectangular parallelepiped from polystyrene foam, sponge or other compressible material, and keeps the bottom of the photo film pack 102 positioned when the casing lid 107 closes the opening 106 of the outer casing 105. Note that the photo film pack 102 is regulated between the retainer flaps 121 and 122. As the retainer flaps 121 and 122 operate reliably, it is possible to omit the resilient retainers 118 and 119, the resilient retainer portions 120a and 120b and the resilient retainer 124.

Figure 12:
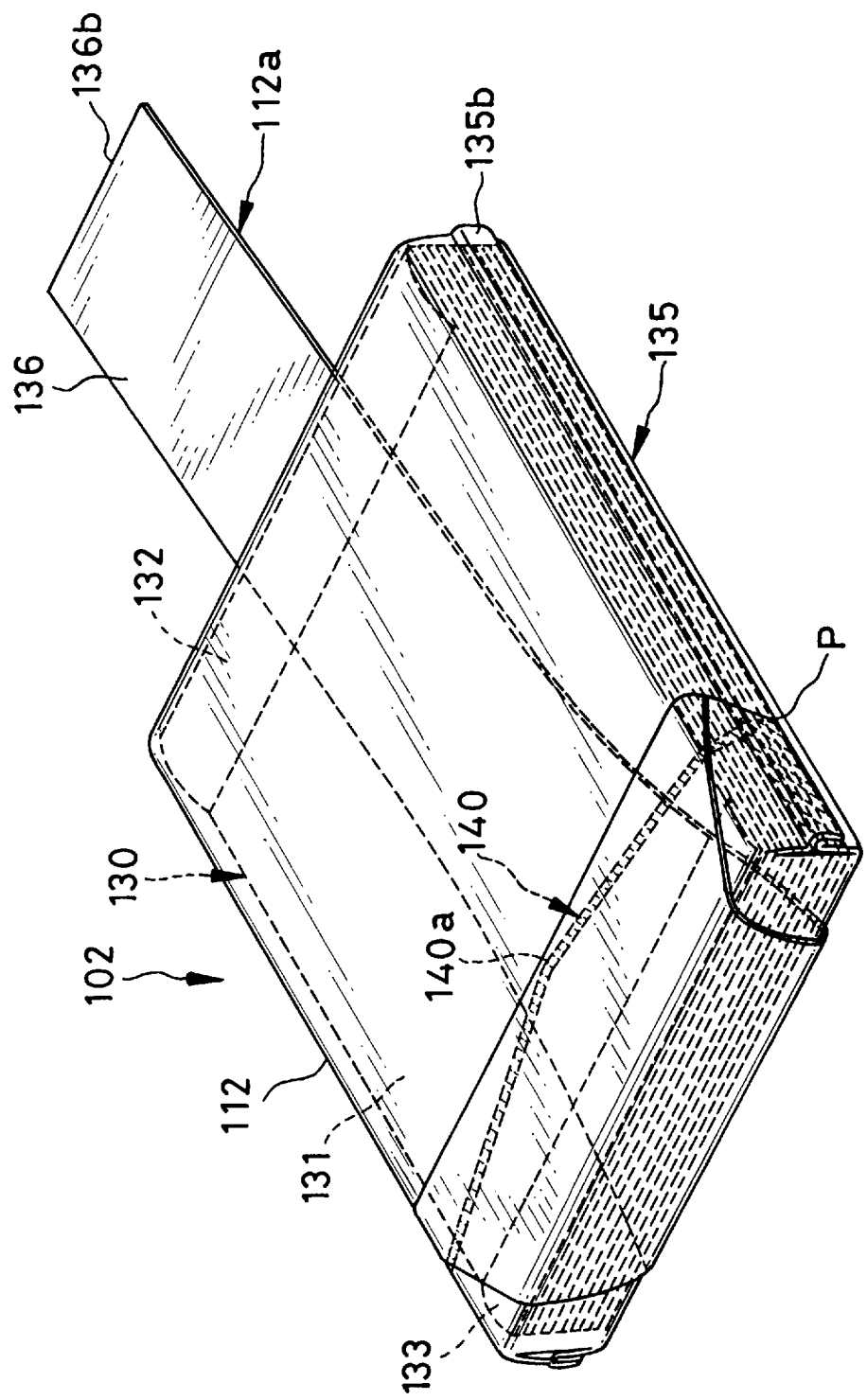
FIG. 12 is a perspective illustrating the photo film pack.

In FIG. 12, the photo film pack 102 includes the light-tight bag 112 and the ten photo film units 130 contained in the light-tight bag 112 in an overlaid state. The photo film units 130 are a self-processing type, and are a unit including a photosensitive sheet 131, a solution pod 132 and a trap portion 133. As is well known in the art, the photosensitive sheet 131 includes a photosensitive layer and an image-receiving layer. The solution pod 132 pre-contains processing solution for development. The trap portion 133 captures surplus part of the processing solution and hardens it. The photo film units 130 are included in a mono-sheet type which can be handled as a single rectangular sheet.

Figure 13:
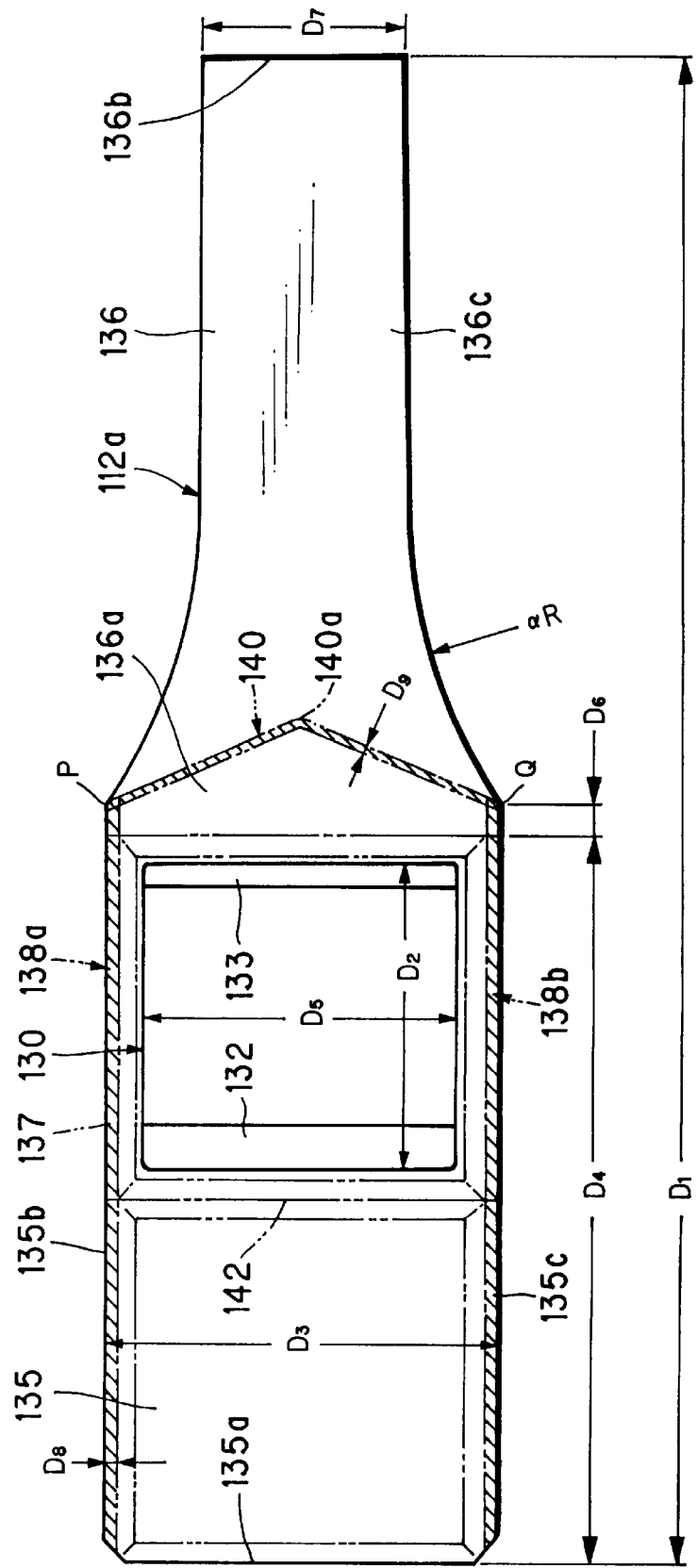
FIG. 13 is a development view illustrating a belt-shaped sheet with one of the photo film units.

In FIG. 13, let D1 be a length of a longer side of the belt-shaped sheet 112a. Let D2 be a length of the photo film units 130. D1 is approximately 4.3 times as long as D2, as D1 is approximately 416 mm, and D2 is approximately 96 mm. The belt-shaped sheet 112a is constituted by a bag component 135 and a tab 136 extended therefrom. The bag component 135 is bent in two and has a substantially rectangular shape. The belt-shaped sheet 112a is formed from polyethylene (PE) with which carbon black is mixed. In the present embodiment, a polyethylene sheet being 20 μm thick and a polyester sheet being 12 μm thick are laminated to form the belt-shaped sheet 112a. One surface of the belt-shaped sheet 112a is coated with a polyurethane type of adhesive agent for the weak sealing.

The bag component 135 has a shape of a rectangular quadrangle having a width D3 and a length D4. The width D3 is 123 mm and is somewhat greater than a width D5 of the photo film units 130, where D5=96 mm. The length D4 is 220 mm and is over two times as great as the length D2 of the photo film units 130. The tab 136 includes a root 136a and a tab end 136c less wide than the root 136a. The root 136a is an extension of the bag component 135 with a length D6 of 10 mm. The tab end 136c has edges curved with an arc at a radius of αR to decrease its width. The tab end 136c has an end line 136b of which a width D7 is 60 mm, as α distal end of the belt-shaped sheet 112a. Note that a is in a range of 100–300 mm, and preferably 160 mm.

Along edges 135b and 135c of the bag component 135, there are sealing lines 138a and 138b coated with adhesive agent 137 for the weak sealing as indicated by hatching. The sealing lines 138a and 138b extend from corners of an end 135a of the bag component 135 to corners P and Q of the root 136a of the tab 136. The sealing lines 138a and 138b have a width D8=4 mm. There is a sealing line 140 extending between the corners P and Q and in a direction of a width D3 of the bag component 135. The sealing line 140 has a V-shape of which a vertex 140a is directed to the end line 136b and the corners P and Q are ends of two slopes. The sealing line 140 is coated with the adhesive agent 137 in a weak manner at a width D9=2 mm. The adhesive agent 137 of the sealing lines 138a and 138b and the sealing line 140 has such a characteristic that, after being dried as a coating, it does not adhere to an object or adsorb dust or other fine particles as far as it is left to stand. Only when heated and pressurized, the adhesive agent 137 becomes adhesive.

Figure 14:
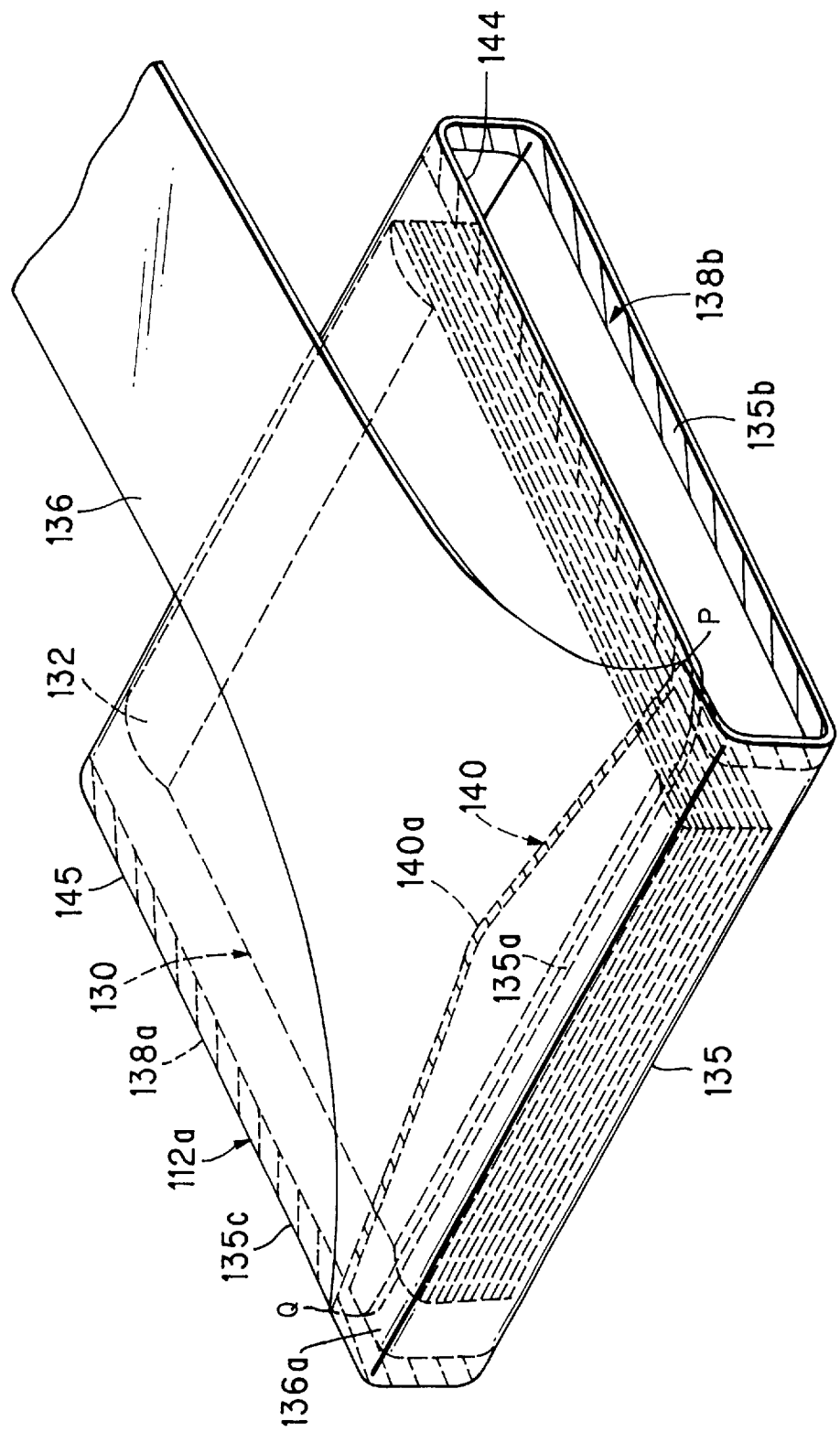
FIG. 14 is a perspective illustrating an unfinished state of the photo film pack.

To wrap the photo film units 130 with the belt-shaped sheet 112a, at first belt-shaped sheet 112a is bent into two along a bend line 142 determined in a position of a half of the length D4 of the bag component 135. The ten photo film units 130 are inserted between two portions of the belt-shaped sheet 112a. Then the tab 136 is overlapped on the bag component 135. The sealing line 140 is heated and pressurized through the tab 136. In FIG. 14, the root 136a of the tab 136 is welded to the bag component 135 near to the end 135a. The belt-shaped sheet 112a is formed in a tubular manner to wrap the photo film units 130.

In open edges 144 and 145 of the bag component 135, portions of the edges 135b and 135c near to the four corners of the photo film units 130 are bent in an M-shape as viewed in the open edges 144 and 145, and then fitted on one another to seal the sealing line 138a and seal the sealing line 138b. Heat and pressure are applied to them to seal the edges 135b and 135c of the bag component 135 light-tightly in the manner of the weak sealing. The edges 135b and 135c being erected are folded down and attached to lateral face portions of the bag component 135 in the same manner of the weak sealing.

The tab 136 of the belt-shaped sheet 112a is bent back in a position deviated toward the solution pod 132, back from the vertex 140a of the sealing line 140, for the tab 136 to wrap the trap portion 133 and for the end line 136b of the tab 136 to protrude to the outside of the solution pod 132. In FIG. 12, the photo film pack 102 is finally obtained.

After the winder shaft 103 is retained to the end line 136b of the tab 136, the photo film pack 102 is inserted into the outer casing 105 while the winder shaft 103 is directed to the inside of the outer casing 105. A pair of fork-shaped tools respectively having a U-shaped tip are used to support axial ends of the winder shaft 103, and insert the winder shaft 103 with the photo film pack 102. After the winder shaft 103 is squeezed between the shaft retainers 116 and 117, the tools are moved away from the receiving spaces 114 and 115. The retainer flaps 121 and 122 have been bent down by the tools, but are forcibly erected again. The retainer flaps 121 and 122 are set to limit the edges of the photo film pack 102. The casing lid 107 closes the opening 106 to complete the photo film pack cartridge FPC. Note that a piece of seal or sticker is attached to a border between the outer casing 105 and the casing lid 107 to fix the casing lid 107 on the outer casing 105 without being dropped away.

In FIGS. 15 and 16, an instant camera 150 for use with the photo film pack cartridge FPC is depicted. A pack holder 152 as an auxiliary chamber is movable into, and partially out of, the loader chamber 151, and receives insertion of the photo film pack cartridge FPC. The pack holder 152 is pivotal about a rod 154 and supported on the inside of a back lid 153, and biased in a direction away from the back lid 153 by a spring (not shown) placed on the rod 154. Openness of the pack holder 152 is regulated by a stop mechanism, which is constituted by a slot 155a and a pin 157. The slot 155a is formed in a metal rail 155 fixed on the back lid 153. The pin 157 is fixed on a rear plate 156. A top of the pack holder 152 has a pack entrance 152a for receiving the photo film pack cartridge FPC. A front of the pack holder 152 has an exposure opening 152b. A front of the rear plate 156 has an opening 156a, through which a pressure plate 161 is moved. The pressure plate 161 is fixedly retained on the inside of the back lid 153.

Long support plates 162 and 163 are disposed along sides of the inside of the pack holder 152. Each of the support plates 162 and 163 has a cutout 165 for receiving the winder shaft 103 at each axial end. The cutout 165 is constituted by inclined faces 165a combined as a V-groove and a circular axial hole 165b communicating to the inclined faces 165a. When the winder shaft 103 is pushed into the cutout 165, top ends of the support plates 162 and 163 are deformed to allow the circular axial hole 165b to receive the winder shaft 103. After the winder shaft 103 is inserted in the circular axial hole 165b, the top ends of the support plates 162 and 163 recover their initial shapes to keep the winder shaft 103 from dropping incidentally.

A top of the loader chamber 151 has a photo film exit path 151a of a small width for exiting the photo film units 130 from the loader chamber 151 after taking an exposure. Above the exit path 151a, there are spreader rollers 167 and 168 for nipping and moving the photo film units 130 upwards to the outside. The solution pod 132 is squeezed by them to spread processing solution to the whole of the photosensitive sheet 131. A drive gear 170 as a drive mechanism is disposed on the spreader roller 168, and is meshed with the gear 110 of the winder shaft 103 when the back lid 153 is closed. Above the spreader rollers 167 and 168, there is a photo film exit path 171 of a small width for exiting the photo film units 130 after each exposure.

To load the instant camera 150 with the photo film units 130, at first the back lid 153 is opened for the pack entrance 152a of the pack holder 152 to appear. Then the casing lid 107 is removed from the photo film pack cartridge FPC. The photo film pack cartridge FPC is inserted into the pack holder 152 through the pack entrance 152a by advancing the opening 106 of the outer casing 105. The support plates 162 and 163 are inserted into the receiving spaces 114 and 115 inside the outer casing 105 beside the photo film pack. The support plates 162 and 163 contact the retainer flaps 121 and 122, and are caused by the inserting force of the photo film pack cartridge FPC to bend down the retainer flaps 121 and 122. The support plates 162 and 163 are moved further inwards.

Figure 17:
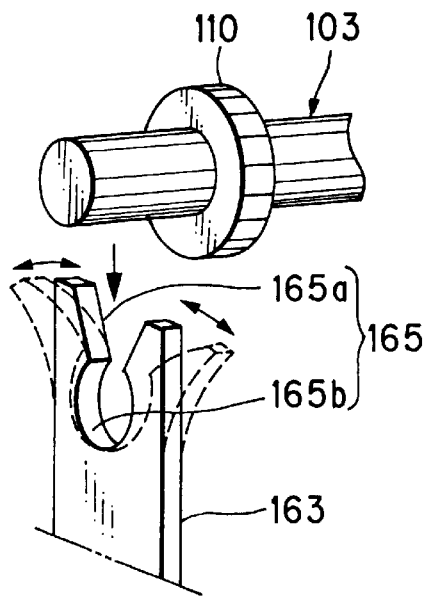
FIG. 17 is an explanatory view in perspective, illustrating the winder shaft with a support member of the instant camera.
Figure 21:
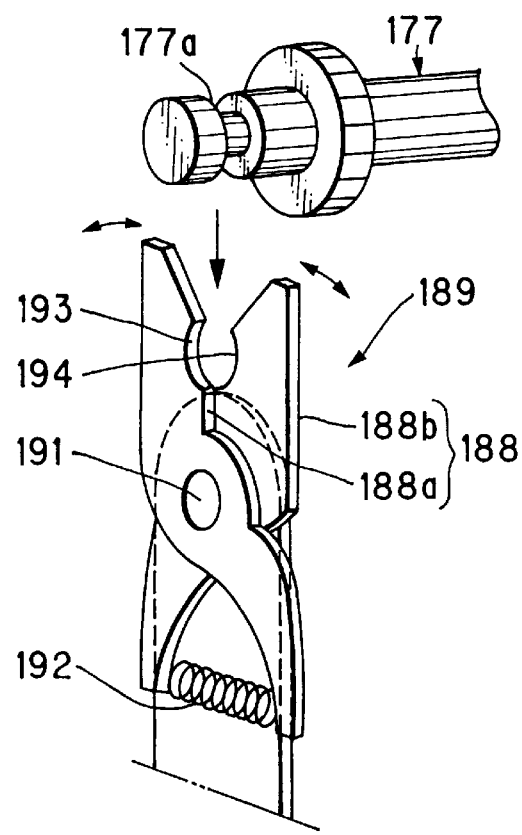
FIG. 21 is an explanatory view in perspective, illustrating support mechanism including a pincer-shaped receiver with the winder shaft of FIG. 18A.

When the photo film pack cartridge FPC is inserted into the pack holder 152, ends of the support plates 162 and 163 contact axial ends of the winder shaft 103. In FIG. 16, lateral ends of the top of the outer casing 105 are pushed substantially vertically as indicated by the arrows α and β, so that the axial ends of the winder shaft 103 are forcibly pushed into the inclined faces 165a in the cutout 165 via the resilient retainers 118 and 119. As illustrated in FIG. 17, the ends of the support plates 162 and 163 are resiliently deformed to allow inserting the ends of the winder shaft 103 into the circular axial hole 165b. Then abruptly the support plates 162 and 163 return to their initial forms, and capture the axial ends of the winder shaft 103 in a rotatable manner. The user pulls up the tab 108 to raise the outer casing 105, to set the photo film pack 102 in the pack holder 152.

When the back lid 153 is closed, the gear 110 of the winder shaft 103 comes in mesh with the drive gear 170 of the spreader roller 168 as depicted in FIG. 15. The shutter release button is depressed. Rotation of the spreader roller 168 causes the winder shaft 103 to rotate, to wind the tab 136 about the winder shaft 103. In the course of winding the tab 136 about the winder shaft 103, pulling force is concentrated to the vertex 140a of the sealing line 140, which can easily start being peeled. The position of being peeled is shifted in two directions toward the corners P and Q, and thereafter toward the sealing lines 138a and 138b.

When the sealing lines 138a and 138b are peeled completely, the light-tight bag 112 becomes the belt-shaped sheet 112a of the original shape again, all of which is wound about the winder shaft 103. Then a detector mechanism associated with the winder shaft 103 detects a change in resistance to rotation of the winder shaft 103. In response to this detection the spreader roller 168 is controlled to stop the winder shaft 103. The photo film loading operation is finished by setting the ten photo film units 130 in the pack holder 152. The pressure plate 161 is pushing the stack of the photo film units 130 toward an exposure opening 151b in the loader chamber 151. One uppermost or foremost photo film unit 130a included in them is set in an exposure station.

When the shutter release button is depressed with a taking lens 175 directed to a photographic subject, a brightness of the subject is measured by a photometric operation, before the shutter mechanism is driven. The uppermost photo film unit 130a is exposed through the exposure opening 151b. Immediately after the exposure, an ejector claw in the instant camera 150 is actuated and engaged with an edge at the trap portion 133 of the uppermost photo film unit 130a. The uppermost photo film unit 130a is pushed upwards toward the exit paths 151a and 171. The spreader rollers 167 and 168 start rotating.

While the solution pod 132 of the uppermost photo film unit 130a is moved through the exit path 151a, the spreader rollers 167 and 168 squeeze the solution pod 132 and at the same time advance the uppermost photo film unit 130a toward the exit path 171. When the uppermost photo film unit 130a is moved through the exit path 171, the processing solution is uniformly spread on the surface of the photosensitive sheet 131 of the uppermost photo film unit 130a by the spreader rollers 167 and 168. After the uppermost photo film unit 130a is exited, a positive object image appears on the photosensitive sheet 131 of the uppermost photo film unit 130a at the lapse of a predetermined duration.

Similarly the shutter release button is depressed to exposed the photo film units 130 one after another in the loader chamber 151. At the end of finish of exposing all the photo film units 130, the winder shaft 103 with the belt-shaped sheet 112a wound thereabout remains on the support plates 162 and 163. The winder shaft 103 is manually removed from the camera, before a new photo film pack cartridge FPC is inserted into the pack holder 152.

Therefore the photo film units 130 can be loaded without a manual direct touch to the photo film pack 102. There does not occur a pressure fogging or a static fogging to the photo film units 130. There is no error of peeling the sealing line 140 to expose the photo film units 130 to ambient light. It is to be noted that, although the pack entrance 152a is formed in the top side of the camera, a pack entrance may be formed in a bottom side of a camera for insertion of the photo film pack through its bottom. This has an advantage in possibility in structurally eliminating the pack holder 152. In contrast the type having the pack entrance 152a in the top side has an advantage in easy handling typically at the time of fixation on a tripod.

The winder shaft 103 of the above embodiment is constituted by the rod portion and the gear 110. Alternatively winder shafts of FIGS. 18A–18D may be used. In FIG. 18A, a winder shaft 177 has ring-shaped grooves 177a and 177b, which are formed near to its axial ends, engaged with the support plates of the camera, to keep the winder shaft 177 from shifting in its axial direction. In FIG. 18B, a winder shaft 178 has a recess 178a, formed in its cylindrical surface, for retention of an end of the belt-shaped sheet by adhesive agent or adhesive tape. A gear 179 is fixed on the winder shaft 178. In FIG. 18C, a winder shaft 181 has conical recesses 181a and 181b formed respectively in its axial end faces. In FIG. 18D, a winder shaft 183 has ring-shaped flanges 183a and 183b for regulating ends of a roll of the belt-shaped sheet.

FIGS. 19 and 20 illustrate various examples of support mechanisms for supporting the winder shaft 181. In FIG. 19, a support plate 185 has a conical projection 185a, which is inserted in each of the conical recesses 181a and 181b. FIG. 20 illustrates a ball plunger 186 as a support. In addition to the structures in FIGS. 17, 19 and 20, a support mechanism 189 including a pincer-shaped receiver 188 of FIG. 21 may be used. The pincer-shaped receiver 188 consists of a first blade 188a and a second blade 188b which are pivotal about a central shaft 191. There is a compression coil spring 192, disposed in a bottom of the pincer-shaped receiver 188, for biasing the first and second blades 188a and 188b in a direction to move their blade ends toward each other. Note that axial recesses 193 and 194 formed in the first and second blades 188a and 188b and combined as axial hole have a size associated with a diameter of the winder shaft 177.

It is to be noted that the ball plunger 186 of FIG. 20 is structured as follows: The ball plunger 186 consists of a base plate, a ball holder, a ball and a spring. The ball holder is confronted with each of axial ends of the winder shaft 181. The ball is disposed to project from the ball holder, for receiving the conical recess 181a or 181b at the axial ends of the winder shaft 181. The spring is disposed in the ball holder, for biasing the ball toward the winder shaft 181.

Note that, when the support plate 185 with the conical projection 185a or ball plunger 186 is used as support mechanism, there can be a pair of lateral slots (not shown), which are formed in the outer casing, for access of them to the winder shaft 181.

Figure 22A:
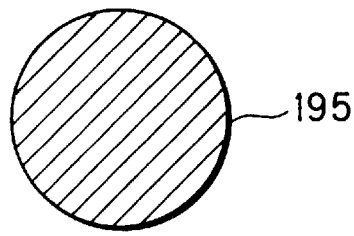
FIG. 22A is a cross section illustrating the winder shaft of a rod shape.
Figure 22B:
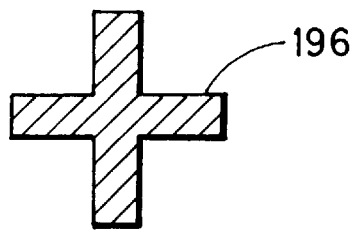
FIG. 22B is a cross section illustrating a cross-shaped polygon of a prismatic shape of another preferred winder shaft.
Figure 22C:
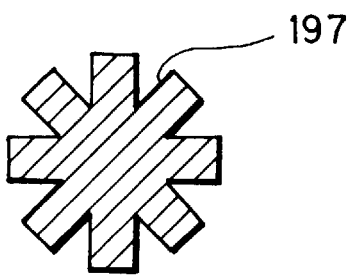
FIG. 22C is a cross section illustrating a star polygon of a prismatic shape of a winder shaft.
Figure 22D:
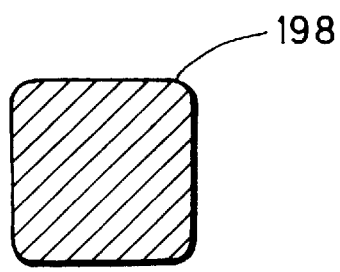
FIG. 22D is a cross section illustrating a square of a prismatic shape of a winder shaft.

In FIGS. 22A–22D, other preferred winder shafts are illustrated. In FIG. 22A, a winder shaft 195 has a rod shape or circular shape as viewed in cross section. In FIG. 22B, a winder shaft 196 has a crossed shape as viewed in cross section. In FIG. 22C, a winder shaft 197 is shaped in a prism of a star polygon. In FIG. 22D, a winder shaft 198 is shaped in a polygonal prism such as a square prism. Note that it is preferable to dispose a guide member (not shown) on the inner side of the support plates 162 and 163 for the purpose of preventing the belt-shaped sheet from moving in a zigzag about the winder shaft.

Figure 23:
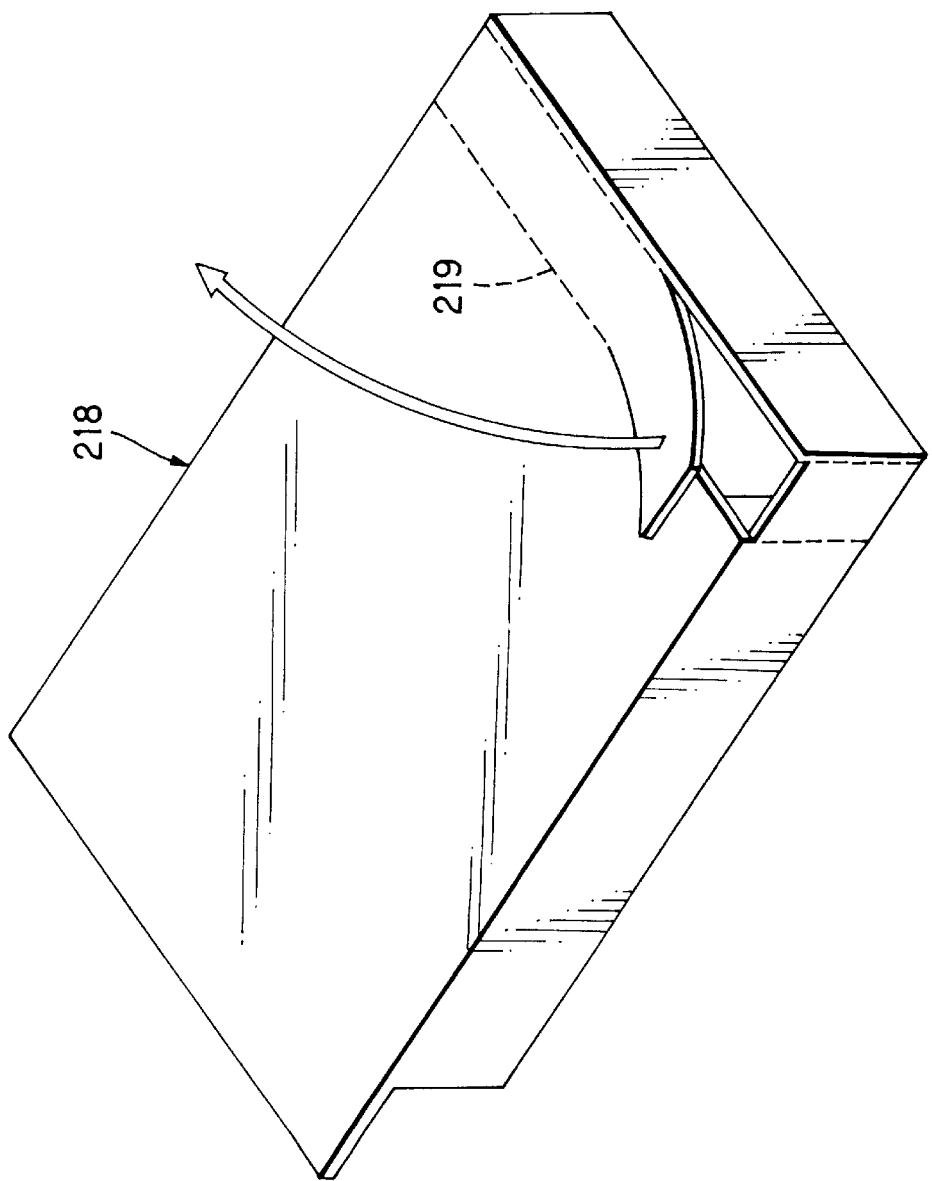
FIG. 23 is a perspective illustrating another preferred embodiment, in which an outer casing contains a bag holder or casing on which the photo film pack is placed.
Figure 24:
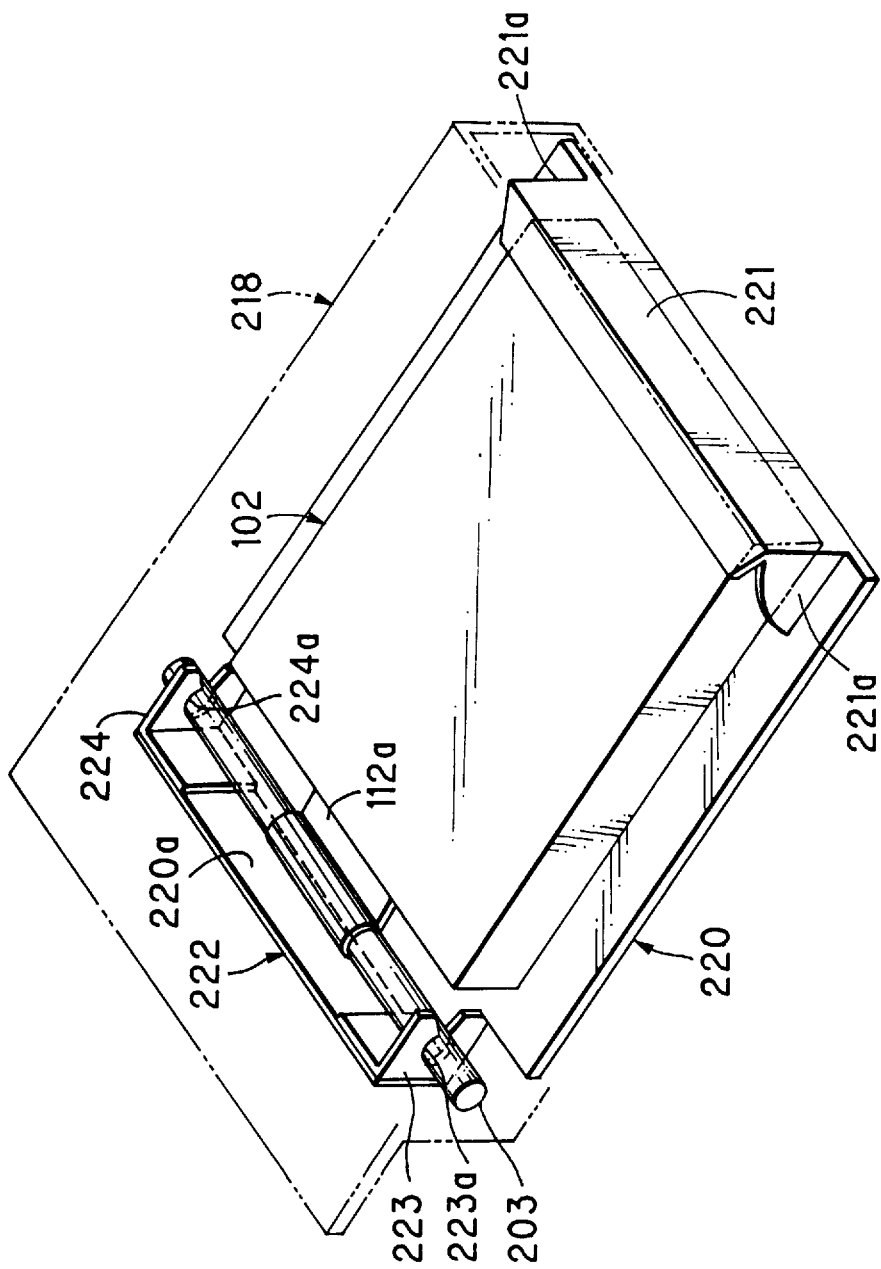
FIG. 24 is an explanatory view in perspective, illustrating the bag holder or casing with the photo film pack.

FIGS. 23 and 24 illustrate other embodiments of the photo film pack cartridge FPC. An outer casing 218 or bag holder contains a fixed plate 220 which is formed from thick paper or cardboard, and on which the photo film pack 102 and a winder shaft 203 are placed. The fixed plate 220 is fixed inside the outer casing 218, and is inserted in a camera together therewith. In FIG. 23, the outer casing 218 can be opened by cutting along a perforation line 219, which has been formed in the periphery of the outer casing 218 along its one side.

A retainer 221 for avoiding dropping the photo film pack 102 is constituted by an extension of the fixed plate 220 and lateral tongues 221a and 221b. The extension of the fixed plate 220 is bent in a channel shape. The lateral tongues 221a and 221b are bent in inward directions. A shaft support 222 is disposed in a position opposite to the retainer 221. The shaft support 222 is constituted by an extension of the fixed plate 220 and shaft retainer plates 223 and 224. The extension of the fixed plate 220 is bent upwards at a right angle. The shaft retainer plates 223 and 224 are fixed on an inner wall face 220a of the fixed plate 220. There are retainer grooves 223a and 224a formed in the shaft retainer plates 223 and 224, for receiving insertion of the winder shaft 203 to support the winder shaft 203 in a stationary manner.

Figure 25:
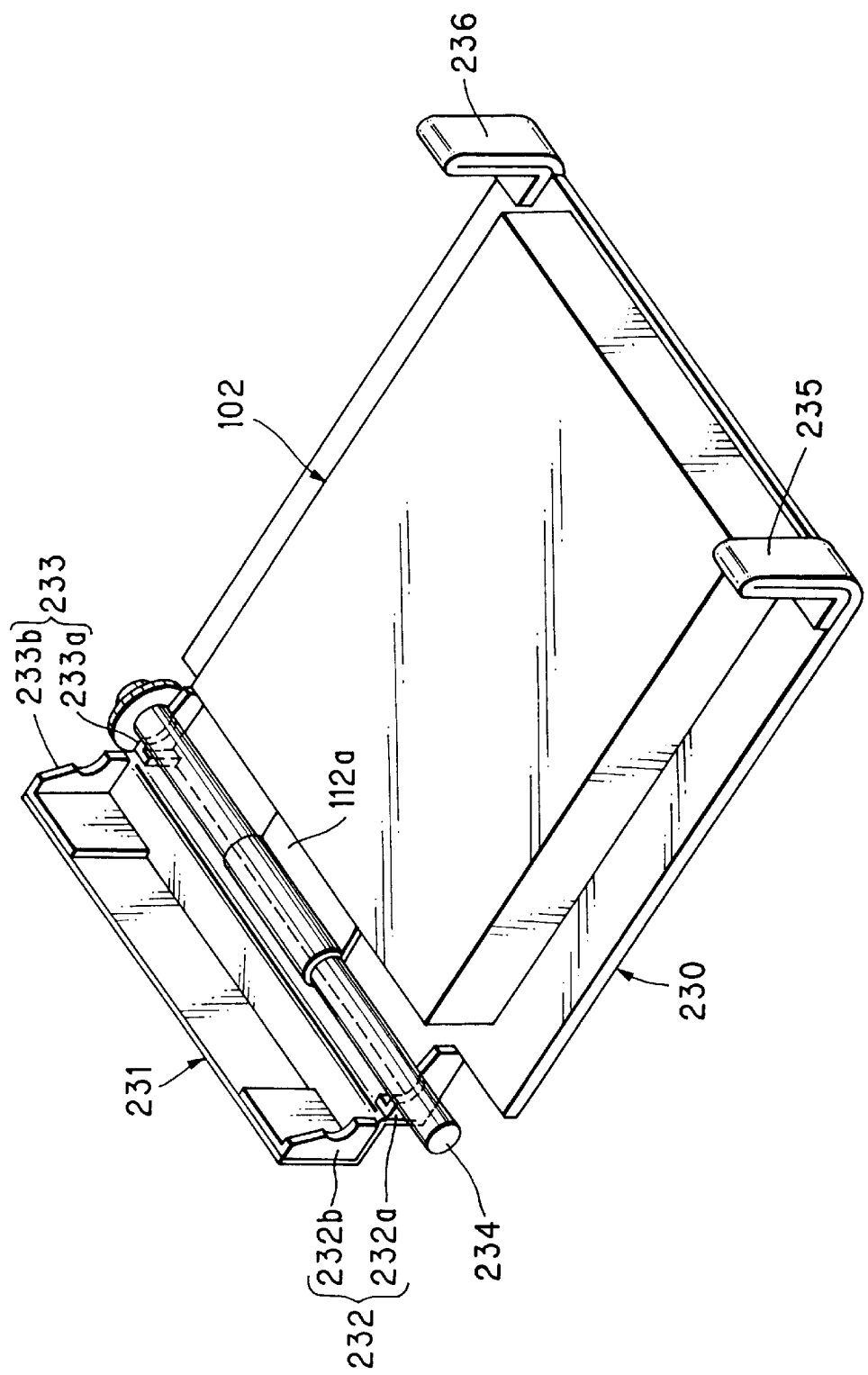
FIG. 25 is an explanatory view in perspective, illustrating another preferred bag holder or casing with the photo film pack, where a winder shaft can be preserved more stably.

In FIG. 25, another preferred fixed plate 230 is depicted. A shaft support 231 includes shaft retainers 232 and 233, each of which are split into two. At first a winder shaft 234 is placed on stationary halves 232a and 233a, then is secured within the shaft support 231 by closing movable halves 232b and 233b. Note that the movable halves 232b and 233b are not directly fixed on the stationary halves 232a and 233a, and would move away therefrom. However the fixed plate 230 is inserted in the outer casing 218 to keep the movable halves 232b and 233b in contact with the stationary halves 232a and 233a. The winder shaft 234 is kept stationary, and prevented from being unstable.

There are retainer flaps 235 and 236 disposed in positions opposite to the shaft support 231. The retainer flaps 235 and 236 are formed by erection of two extensions of the fixed plate 230 with a bend of a right angle. The retainer flaps 235 and 236 position the photo film pack 102 at the center of the fixed plate 230. When the support mechanisms of the camera are inserted respectively in receiving spaces, the retainer flaps 235 and 236 are pushed by them and are folded to fall down.

In addition, the fixed plates 220 and 230 can be formed from thick paper, cardboard, resin or any other suitable flexible material.

In the present embodiments, the fixed plate 220, 230 is attached to the inside of the outer casing 218 with adhesive agent or the like, and fixed to the outer casing 218. The combination of the outer casing 218 and the fixed plate 220, 230 consists of the bag holder. Alternatively the plate 220, 230 may be removable from the outer casing 218. The outer casing 218 may be only an external package from which the plate 220, 230 may be pulled out before simply the plate 220, 230 may be inserted into an instant camera. Only the plate 220, 230 may consist of a bag holder.

Note that the plates 220 and 230 can have the tab 108 in a manner similar to the outer casing 105 of the above embodiment. The tab 108 can be pulled out manually, so that the winder shaft 203 and 234 can be removed from the shaft supports 221 and 231 by the pulling force.

The term of the "weak sealing" is defined the same as described with FIGS. 1 and 2. If the sealing should be too strong, the winder shaft receives too much force for the purpose of peeling the sealing. Gears may be broken, the shaft may be deformed, or a battery of the camera may be used up too quickly. If the sealing should be too weak under the level of the weak sealing, it is likely that the sealed area is peeled while handled, to cause a fogging of the photo film unit.

In the above embodiments, the opening 106 in the bottom of the outer casing 105 is closed by the casing lid 107. Alternatively a sealing member or piece of paper or cardboard may be used to close the opening 106, and may have a size slightly greater than the casing lid 107 in a simpler manner.

In the above embodiments, only the sealing lines of the belt-shaped sheet 112a are coated with adhesive agent. Alternatively the whole of one surface or both surfaces of the belt-shaped sheet 112a may be coated with adhesive agent, before the sealing lines may be pressurized and heated.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant photo film pack having a stack of plural photo film units of a self-processing type, and a light-tight bag for containing said photo film units in a light-tight manner, comprising:

said light-tight bag having a bag component constituted by one belt-shaped sheet, and a tab disposed to project from said bag component, wherein said bag component is formed by attaching one portion to another in a peelable manner, and when said tab is pulled in one direction, attachment of said bag component is peeled, to strip said bag from said photo film units in a form of said belt-shaped sheet.

2. An instant photo film pack as defined in claim 1, wherein said belt-shaped sheet has a width greater than a width of said photo film units.

3. An instant photo film pack as defined in claim 2, wherein said belt-shaped sheet is three or more times as long as said photo film units.

4. An instant photo film pack as defined in claim 2, wherein said bag component includes:

a first portion defined by bending back said belt-shaped sheet about a first bend line, said first portion being substantially rectangular and surrounded by a combination of said first bend line, two lateral sides and an end side; and a second portion confronted with said first portion, defined between said first portion and said tab, a second bend line being defined between said second portion and said tab, at least said two lateral sides being attached to said second portion in a peelable manner.

5. An instant photo film pack as defined in claim 4, wherein said tab has first and second sections between which a third bend line is defined;

said first section is bent back along said second bend line and overlaid on said first portion, said first section being attached to said first portion in a peelable manner via a sealing line;

said second section is bent back along said third bend line and overlaid on said first section and said second portion, said second section having a distal end extending beyond said bag component.

6. An instant photo film pack as defined in claim 5, wherein said sealing line has a V-shape for being peeled gradually when said tab is pulled.

7. An instant photo film pack as defined in claim 5, wherein said second section of said tab has a width smaller than said first and second portions.

8. An instant photo film pack as defined in claim 7, wherein said second section of said tab has said width decreasing toward said distal end.

9. An instant photo film pack as defined in claim 5, wherein said belt-shaped sheet comprises a first sheet constituted by said first portion, and a second sheet constituted by said second portion and said tab, said first and second sheets are attached to each other in an undetachable strong manner via said first bend line.

10. An instant photo film pack as defined in claim 5, wherein said belt-shaped sheet is formed from at least one selected from polyethylene, polypropylene, polyethylene terephthalate, polyamide, polycarbonate, polystyrene, polyphenylene oxide, and polyester.

11. An instant photo film pack as defined in claim 10, wherein said belt-shaped sheet includes light-shielding material, said light-shielding material being at least one selected from carbon black, aluminum, titanium oxide, red iron oxide, calcium carbonate, and organic pigment.

12. An instant photo film pack as defined in claim 11, wherein said belt-shaped sheet is attached by adhesive agent, and said adhesive agent is at least one selected from polyvinyl acetate, polyacrylic acid ester, polyamide, polyester, thermoplastic polyurethane, and polyvinyl alcohol.

13. An instant photo film pack as defined in claim 1, further comprising:
   a winder shaft for peeling said light-tight bag and for winding said belt-shaped sheet, said winder shaft having a length greater than a width of said light-tight bag, a distal end of said tab being retained on said winder shaft;
   a bag holder for containing said winder shaft and said light-tight bag containing said photo film units;
   a first retainer, disposed in said bag holder, for positioning said light-tight bag in a manner drawable from said bag holder; and
   two second retainers, disposed in said bag holder, for positioning said winder shaft in a removable manner with axial ends of said winder shaft extended beyond said width of said light-tight bag.

14. An instant photo film pack as defined in claim 13, wherein said bag holder includes a casing of which one end is open or openable, said casing being inserted into an instant camera with said open or openable end advanced therein, and then removed from said instant camera, said winder shaft and said light-tight bag being moved out of said open or openable end and remaining in said instant camera;
   said first retainer positions said light-tight bag with spaces kept for receiving a pair of support members of said instant camera between an inside of said casing and sides of said light-tight bag when said casing is inserted in said instant camera; and
   said second retainers are disposed in a position inside said casing to allow said support members to support said winder shaft in a rotatable manner when said support members are received in said casing.

15. An instant photo film pack as defined in claim 14, further comprising a gear, secured to at least one axial end of said winder shaft, engageable with a drive mechanism of said instant camera, and rotated to wind said belt-shaped sheet from said bag component.

16. An instant photo film pack as defined in claim 14, wherein said bag holder further includes a plate fixed inside said casing, said first and second retainers being secured to said plate, said light-tight bag being mounted to said plate.

17. An instant photo film pack as defined in claim 14, wherein said first retainer includes first and second flaps, projecting in said space, for regulating positions of lateral edges of said photo film units therebetween, said first and second flaps being folded down by said support members of said instant camera accessing said winder shaft through said space.

18. An instant photo film pack as defined in claim 14, wherein said two second retainers include first and second resilient retainer members, respectively secured to inside walls of said casing, confronted with respective axial ends of said winder shaft, for resiliently squeezing said winder shaft.

19. An instant photo film pack as defined in claim 14, wherein said two second retainers include at least one resilient member deformed when said casing is drawn from said instant camera, to allow removal of said winder shaft therefrom with said winder shaft kept engaged with said support members.

20. An instant photo film pack as defined in claim 14, wherein said two second retainers include:
   first and second retainer plates, disposed in association with respective axial ends of said winder shaft; and
   first and second retainer grooves, being formed in respectively said first and second retainer plates, being open toward said photo film units, fitted on respectively said axial ends of said winder shaft, to support said winder shaft against said support members of said instant camera when said support members are pushed to said winder shaft, said winder shaft being removed from said first and second retainer grooves when said casing is drawn from said instant camera.

21. An instant photo film pack as defined in claim 20, wherein each of said first and second retainer plates includes a stationary portion and a movable portion between which said first or second retainer groove is located, said stationary portion being stationary inside said casing, said movable portion being swingable from said stationary portion, said movable portion being swung a way from said stationary portion before said winder shaft is fitted in said first and second retainer plates.

22. An instant photo film pack as defined in claim 15, wherein said winder shaft includes a slot formed in substantially a center thereof to come through, for receiving insertion of said distal end of said tab.

23. An instant photo film pack as defined in claim 22, wherein said distal end of said tab is moved from an entrance of said slot to an exit of said slot, then drawn out of said slot exit by a length over half a circumference of said winder shaft, again inserted into said slot entrance for securing said tab to said winder shaft.

24. An instant photo film pack as defined in claim 22, wherein said winder shaft further includes a pair of ring-shaped grooves, formed in positions near to respective axial ends thereof, for receiving said support members of said instant camera to prevent axial deviation thereof.

25. An instant photo film pack as defined in claim 22, wherein said winder shaft further includes a pair of flange portions, formed to project therefrom in positions near to respective axial ends thereof, for preventing said belt-shaped sheet from axial deviation therebetween in winding said belt-shaped sheet.

26. An instant photo film pack as defined in claim 22, wherein said winder shaft further includes first and second conical recesses, formed in respective axial ends thereof, for receiving said support members of said instant camera to be supported in a rotatable manner.

27. An instant photo film pack as defined in claim 15, wherein said winder shaft includes a recess, formed in substantially a center thereof to extended in an axial direction thereof, said distal end of said tab being secured to said recess.

28. An instant photo film pack as defined in claim 15, wherein said winder shaft substantially has a rod shape, a shape of a polygonal prism, or a shape of a prism of a star polygon.

29. An instant photo film pack having a stack of plural photo film units of a self-processing type, and a light-tight bag for containing said photo film units in a light-tight manner, comprising:

a first sheet, substantially rectangular, and surrounded by a combination of a first line, two lateral sides and an end side, to constitute said light-tight bag;

a second sheet, including a confronted portion and a tab, said confronted portion being confronted with said first sheet, to constitute said light-tight bag, said tab being bent back from said confronted portion via a second line, wherein said confronted portion is attached to said first sheet via at least said two lateral sides in a peelable manner, and attached to said first sheet via said first line in an undetachable strong manner, and when said tab is pulled in one direction, attachment of said first sheet and said confronted portion is peeled, to strip said bag from said photo film units with said first and second sheets kept connected.

30. An instant camera for use with a photo film pack cartridge, said photo film pack cartridge including a casing which has an open end and in which an instant photo film pack is mounted, said instant photo film pack having a light-tight bag for containing a stack of plural photo film units of a self-processing type in a light-tight manner, said light-tight bag being constituted by a belt-shaped sheet for covering said photo film units, an entirety of said light-tight bag being unpacked into said belt-shaped sheet and stripped from said photo film units by pulling of a tab thereof, a winder shaft, disposed in said casing in a removable manner, for supporting a distal end of said tab retained thereon, to wind said light-tight bag, said instant camera comprising:

a photo film loader chamber formed to open rearwards;

an openable back lid for closing said photo film loader chamber;

a pack holder, disposed in said loader chamber, having a pack entrance, contained in said loader chamber when said back lid is closed, moved at least partially out of said photo film when said back lid is opened, to cause said pack entrance to appear, said photo film pack cartridge being inserted into said pack holder through said pack entrance with said open end advanced;

two support means, disposed in said pack holder, engaged with said winder shaft for supporting said winder shaft by entering said casing when said photo film pack cartridge is inserted in said pack holder; and a drive mechanism for rotationally driving said winder shaft, said drive mechanism being connected to said winder shaft when said back lid is closed after said casing is drawn out of said pack holder, said winder shaft being rotated to unpack said instant photo film pack by winding said light-tight bag about said winder shaft, said photo film units being set in said loader chamber.

31. An instant camera as defined in claim 30, wherein said back lid is swingable along a lower edge thereof, said pack holder is secured to an inner face of said back lid, said pack entrance being exposed upon opening said upper edge of said back lid outwards.

32. An instant camera as defined in claim 31, wherein each of said two support members includes:

a plate for entering said casing; and a conical projection, protruded from said plate, for receiving each of two conical recesses, said two conical recesses being formed in respective axial ends of said winder shaft.

33. An instant camera as defined in claim 30, wherein each of said two support means includes:

a plate for entering said casing;

a ball holder disposed on said plate;

a ball, contained in said ball holder movably, for entering each of two conical recesses, said two conical recesses being formed in respectively said axial ends of said winder shaft; and a spring, disposed in said ball holder, for biasing said ball toward said winder shaft.

34. An instant camera as defined in claim 30, wherein each of said two support means comprises:

a plate for entering said casing;

a substantially circular axial hole, formed in a top edge of said plate, having an arc-shaped edge determined over half a circumference of one circle, being open toward said pack entrance of said pack holder, for receiving said winder shaft pushed therein and keeping said winder shaft rotatable; and first and second inclined faces, extending from said axial hole toward said pack entrance, inclined in a manner spread towards said pack entrance, for guiding said winder shaft toward said axial hole.

35. An instant camera as defined in claim 34, wherein each of said two support means includes:

a first blade, having a first half of said axial hole and said first inclined face formed therewith;

a second blade, having a second half of said axial hole and said second inclined face formed therewith;

a central shaft about which said first and second blades are rotatable relative to each other;

a first extension portion, formed with said first blade and extended such that said central shaft lies between said first extension portion and said first blade;

a second extension portion, formed with said second blade and extended such that said central shaft lies between said second extension portion and said second blade; and a compression coil spring, connected between said first and second extension portions, for biasing said first and second extension portions away from each other, to bias said first and second halves of said axial hole toward each other.

* * * * *